(12) United States Patent
Tian et al.

(10) Patent No.: US 12,170,629 B2
(45) Date of Patent: Dec. 17, 2024

(54) DMRS SHARING FOR DOWNLINK CONTROL INFORMATION SCHEDULING

(71) Applicant: QUALCOMM Incorporated, San Diego, CA (US)

(72) Inventors: Qingjiang Tian, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 17/647,921

(22) Filed: Jan. 13, 2022

(65) Prior Publication Data

US 2023/0224120 A1 Jul. 13, 2023

(51) Int. Cl.
*H04L 5/00* (2006.01)

(52) U.S. Cl.
CPC .......... *H04L 5/0051* (2013.01); *H04L 5/0037* (2013.01); *H04L 5/0053* (2013.01)

(58) Field of Classification Search
CPC .................. H04L 5/0051; H04L 5/0037; H04L 5/0053; H04L 5/0094
See application file for complete search history.

(56) References Cited

U.S. PATENT DOCUMENTS

| | | | |
|---|---|---|---|
| 10,659,257 B2* | 5/2020 | Hosseini | H04L 5/0087 |
| 11,191,040 B2* | 11/2021 | Patel | H04W 52/34 |
| 2017/0149543 A1* | 5/2017 | Ang | H04L 5/0053 |
| 2017/0223695 A1* | 8/2017 | Kwak | H04L 5/0051 |
| 2018/0145818 A1* | 5/2018 | Choi | H04L 5/023 |
| 2018/0279344 A1* | 9/2018 | Bagheri | H04W 72/23 |
| 2019/0075528 A1* | 3/2019 | Patel | H04W 52/16 |
| 2019/0132157 A1* | 5/2019 | Hosseini | H04L 5/0048 |
| 2019/0149288 A1* | 5/2019 | Hosseini | H04W 72/23 370/329 |
| 2019/0159181 A1* | 5/2019 | Manolakos | H04W 72/23 |
| 2019/0313436 A1* | 10/2019 | Lee | H04L 5/0051 |
| 2019/0342030 A1* | 11/2019 | Hosseini | H04L 1/00 |
| 2019/0349158 A1* | 11/2019 | Wang | H04W 4/027 |
| 2019/0373551 A1* | 12/2019 | Sundberg | H04W 52/0245 |
| 2020/0220681 A1* | 7/2020 | Yang | H04L 5/001 |

(Continued)

FOREIGN PATENT DOCUMENTS

| | | | | |
|---|---|---|---|---|
| AU | 2016391189 A1 * | 8/2018 | .......... | H04L 1/1671 |
| CN | 111247760 A * | 6/2020 | ......... | H04L 25/0224 |

(Continued)

*Primary Examiner* — Shean Tokuta
(74) *Attorney, Agent, or Firm* — Harrity & Harrity, LLP

(57) ABSTRACT

Various aspects of the present disclosure generally relate to wireless communication. In some aspects, a user equipment (UE) may receive a first configuration communication associated with a first shared channel communication that includes a first demodulation reference signal (DMRS) having a first configurable DMRS lifespan, wherein the first configuration communication comprises a DMRS sharing indication associated with reuse of the first DMRS associated with a second shared channel communication. The UE may receive the first shared channel communication. The UE may receive the second shared channel communication based at least in part on the DMRS sharing indication. Numerous other aspects are described.

30 Claims, 8 Drawing Sheets

(56) References Cited

U.S. PATENT DOCUMENTS

| | | | |
|---|---|---|---|
| 2020/0259615 A1* | 8/2020 | Wang | H04L 5/0051 |
| 2020/0389283 A1* | 12/2020 | Manolakos | H04L 5/0044 |
| 2021/0014095 A1* | 1/2021 | Ly | H04W 72/23 |
| 2021/0051596 A1* | 2/2021 | Lee | H04W 52/48 |
| 2021/0105121 A1* | 4/2021 | Chae | H04W 72/20 |
| 2021/0212032 A1* | 7/2021 | Lee | H04W 72/0446 |
| 2021/0226833 A1* | 7/2021 | Park | H04W 72/23 |
| 2021/0243000 A1* | 8/2021 | Choi | H04L 5/005 |
| 2021/0321404 A1* | 10/2021 | Manolakos | H04L 5/0051 |
| 2021/0360561 A1* | 11/2021 | Sakhnini | H04L 5/0053 |
| 2022/0159553 A1* | 5/2022 | Ly | H04L 5/0007 |
| 2022/0231886 A1* | 7/2022 | Ly | H04W 72/0446 |
| 2022/0271886 A1* | 8/2022 | He | H04L 5/0048 |
| 2022/0304013 A1* | 9/2022 | He | H04L 5/0055 |
| 2022/0353037 A1* | 11/2022 | Sakhnini | H04L 27/261 |
| 2022/0386328 A1* | 12/2022 | Liu | H04W 72/40 |
| 2023/0027316 A1* | 1/2023 | Xu | H04L 25/0224 |
| 2023/0034421 A1* | 2/2023 | Zhang | H04L 5/16 |
| 2023/0224120 A1* | 7/2023 | Tian | H04L 5/0051 370/329 |
| 2023/0291523 A1* | 9/2023 | Hasegawa | H04L 5/0094 |

FOREIGN PATENT DOCUMENTS

| | | | | |
|---|---|---|---|---|
| CN | 111295855 A | * | 6/2020 | H04L 5/0048 |
| CN | 108292985 B | * | 2/2021 | H04L 5/0007 |
| CN | 110178331 B | * | 4/2022 | H04L 5/0028 |
| CN | 111295857 B | * | 6/2022 | H04J 11/0069 |
| JP | 2020174381 A | * | 10/2020 | H04L 9/40 |
| KR | 20190137759 A | * | 11/2011 | |
| KR | 20180057485 A | * | 5/2018 | |
| KR | 102074289 B1 | * | 2/2020 | |
| WO | WO-2018143882 A1 | * | 8/2018 | H04L 5/0048 |
| WO | WO-2019085953 A1 | * | 5/2019 | H04L 1/16 |
| WO | WO-2020091581 A1 | * | 5/2020 | |
| WO | WO-2020167650 A1 | * | 8/2020 | H04B 7/2656 |
| WO | WO-2020204520 A1 | * | 10/2020 | |
| WO | WO-2021060301 A1 | * | 4/2021 | H04L 1/0061 |
| WO | WO-2021090818 A1 | * | 5/2021 | H04L 1/1887 |

\* cited by examiner

DMRS SHARING FOR DOWNLINK CONTROL INFORMATION SCHEDULING

FIELD OF THE DISCLOSURE

Aspects of the present disclosure generally relate to wireless communication and to techniques and apparatuses for demodulation reference signal sharing for downlink control information scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive a first configuration communication associated with a first shared channel communication that includes a first demodulation reference signal (DMRS) having a first configurable DMRS lifespan, wherein the first configuration communication comprises a DMRS sharing indication associated with reuse of the first DMRS associated with a second shared channel communication. The one or more processors may be configured to receive the first shared channel communication. The one or more processors may be configured to receive the second shared channel communication based at least in part on the DMRS sharing indication.

Some aspects described herein relate to a base station for wireless communication. The base station may include a memory and one or more processors coupled to the memory. The one or more processors may be configured to transmit a first configuration communication associated with a first shared channel communication that includes a first DMRS having a first configurable DMRS lifespan, wherein the first configuration communication comprises a DMRS sharing indication associated with reuse of the first DMRS associated with a second shared channel communication. The one or more processors may be configured to transmit the first shared channel communication. The one or more processors may be configured to transmit the second shared channel communication based at least in part on the DMRS sharing indication.

Some aspects described herein relate to a method of wireless communication performed by a UE. The method may include receiving a first configuration communication associated with a first shared channel communication that includes a first DMRS having a first configurable DMRS lifespan, wherein the first configuration communication comprises a DMRS sharing indication associated with reuse of the first DMRS associated with a second shared channel communication. The method may include receiving the first shared channel communication. The method may include receiving the second shared channel communication based at least in part on the DMRS sharing indication.

Some aspects described herein relate to a method of wireless communication performed by a base station. The method may include transmitting a first configuration communication associated with a first shared channel communication that includes a first DMRS having a first configurable DMRS lifespan, wherein the first configuration communication comprises a DMRS sharing indication associated with reuse of the first DMRS associated with a second shared channel communication. The method may include transmitting the first shared channel communication. The method may include transmitting the second shared channel communication based at least in part on the DMRS sharing indication.

Some aspects described herein relate to a non-transitory computer-readable medium that stores a set of instructions for wireless communication by a UE. The set of instructions, when executed by one or more processors of the UE, may cause the UE to receive a first configuration communication associated with a first shared channel communication that includes a first DMRS having a first configurable DMRS lifespan, wherein the first configuration communication comprises a DMRS sharing indication associated with reuse of the first DMRS associated with a second shared channel communication. The set of instructions, when executed by one or more processors of the UE, may cause the UE to receive the first shared channel communication. The set of instructions, when executed by one or more processors of the UE, may cause the UE to receive the second shared channel communication based at least in part on the DMRS sharing indication.

Some aspects described herein relate to a non-transitory computer-readable medium that stores a set of instructions for wireless communication by a base station. The set of instructions, when executed by one or more processors of the base station, may cause the base station to transmit a first configuration communication associated with a first shared channel communication that includes a first DMRS having a first configurable DMRS lifespan, wherein the first configuration communication comprises a DMRS sharing indication associated with reuse of the first DMRS associated with a second shared channel communication. The set of instructions, when executed by one or more processors of the base station, may cause the base station to transmit the first shared channel communication. The set of instructions, when executed by one or more processors of the base station, may cause the base station to transmit the second shared channel communication based at least in part on the DMRS sharing indication.

Some aspects described herein relate to an apparatus for wireless communication. The apparatus may include means for receiving a first configuration communication associated with a first shared channel communication that includes a first DMRS having a first configurable DMRS lifespan, wherein the first configuration communication comprises a DMRS sharing indication associated with reuse of the first DMRS associated with a second shared channel communication. The apparatus may include means for receiving the first shared channel communication. The apparatus may include means for receiving the second shared channel communication based at least in part on the DMRS sharing indication.

Some aspects described herein relate to an apparatus for wireless communication. The apparatus may include means for transmitting a first configuration communication associated with a first shared channel communication that includes a first DMRS having a first configurable DMRS lifespan, wherein the first configuration communication comprises a DMRS sharing indication associated with reuse of the first DMRS associated with a second shared channel communication. The apparatus may include means for transmitting the first shared channel communication. The apparatus may include means for transmitting the second shared channel communication based at least in part on the DMRS sharing indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
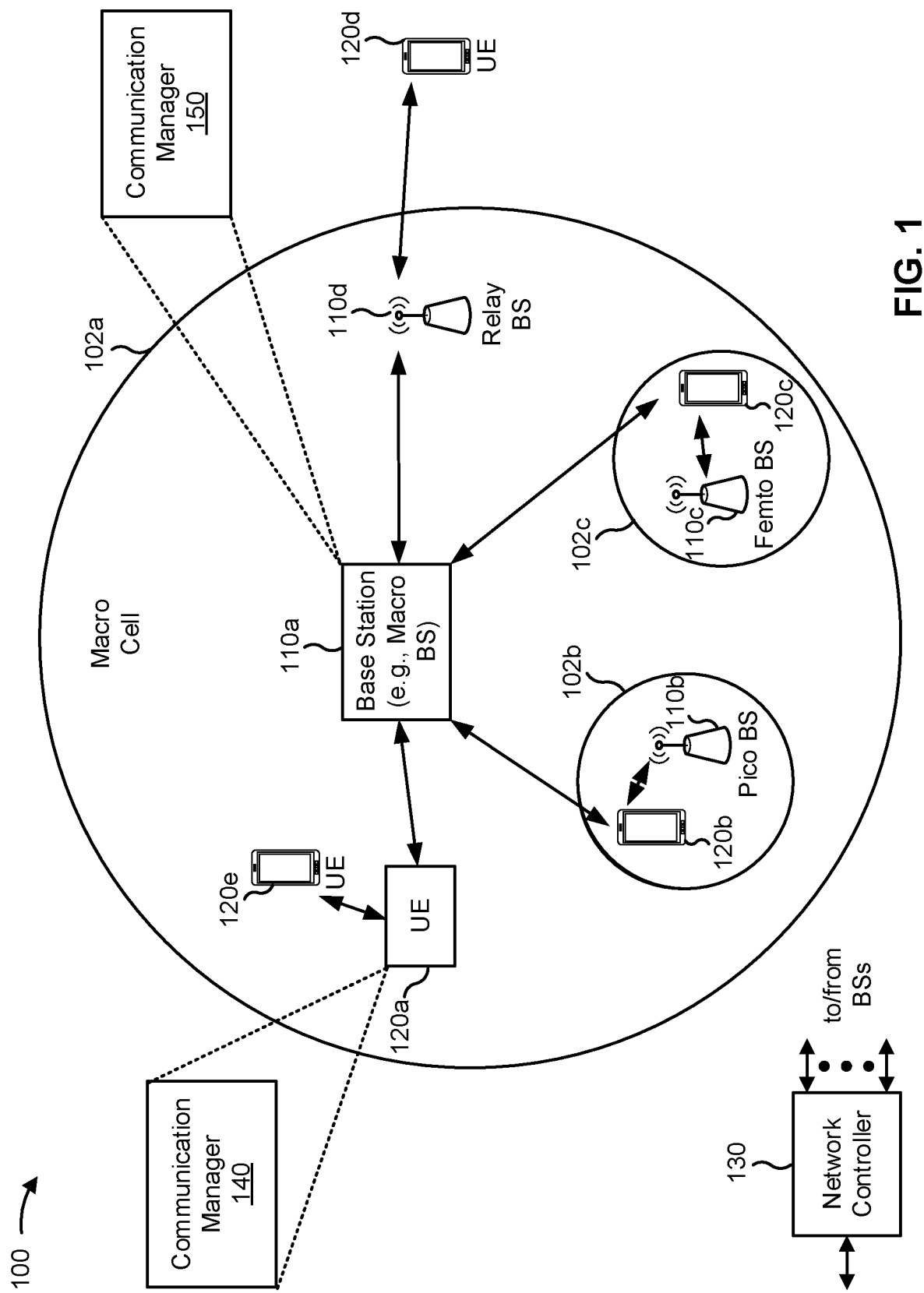
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a first configuration communication associated with a first shared channel communication that includes a first demodulation reference signal (DMRS) having a first configurable DMRS lifespan, wherein the first configuration communication comprises a DMRS sharing indication associated with reuse of the first DMRS associated with a second shared channel communication; receive the first shared channel communication; and receive the second shared channel communication based at least in part on the DMRS sharing indication. Additionally, or alternatively, the communication manager 140 may perform one or more other operations described herein.

In some aspects, the base station 110 may include a communication manager 150. As described in more detail elsewhere herein, the communication manager 150 may transmit a first configuration communication associated with a first shared channel communication that includes a first DMRS having a first configurable DMRS lifespan, wherein the first configuration communication comprises a DMRS sharing indication associated with reuse of the first DMRS associated with a second shared channel communication; transmit the first shared channel communication; and transmit the second shared channel communication based at least in part on the DMRS sharing indication. Additionally, or alternatively, the communication manager 150 may perform one or more other operations described herein.

As indicated above, FIG. 1 is provided as an example. Other examples may differ from what is described with regard to FIG. 1.

Figure 2:
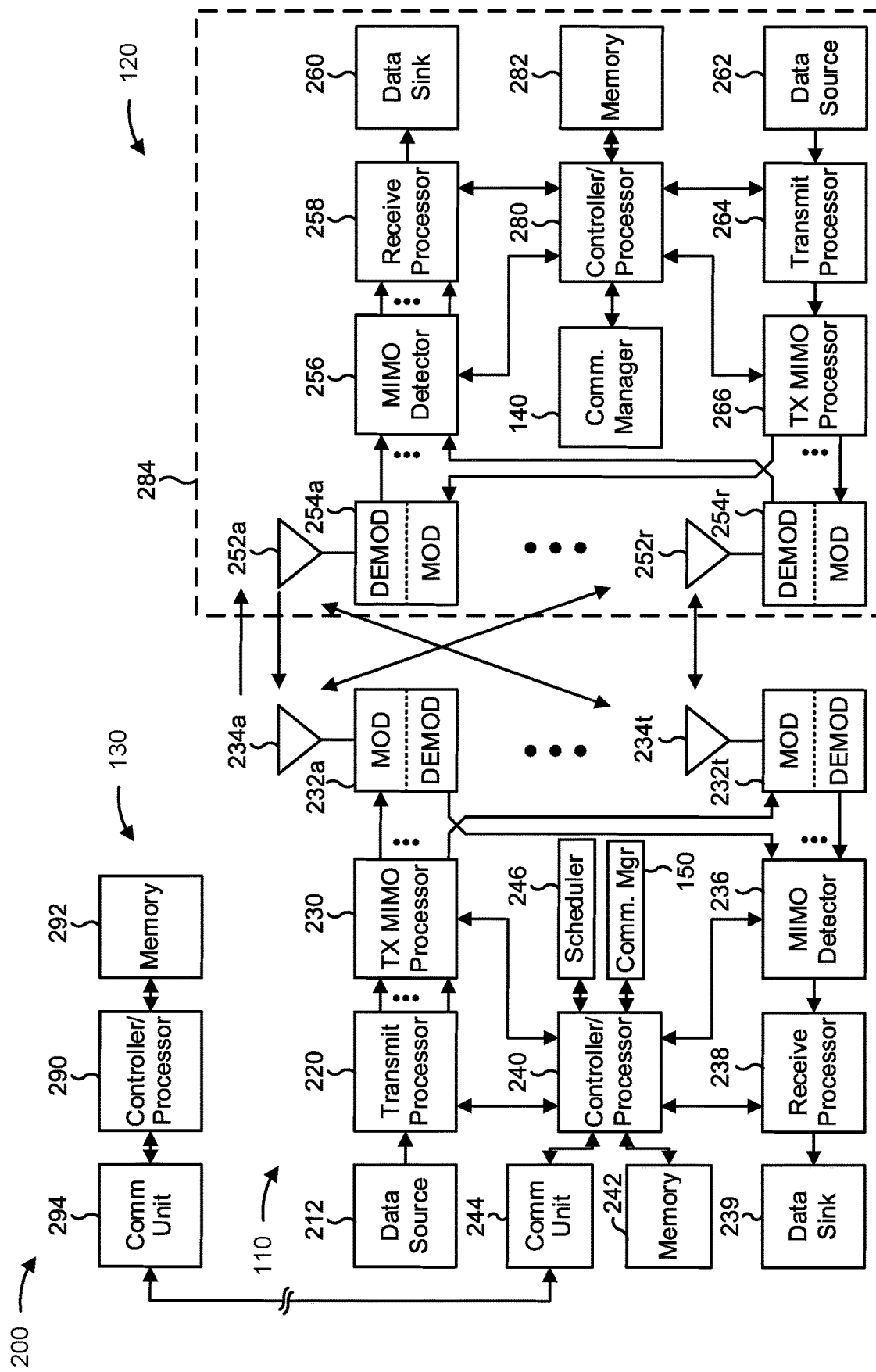
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink control channel (PDCCH) or a physical downlink shared channel (PDSCH). The base station may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a channel state information reference signal (CSI-RS) (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

Some UEs and/or base stations may support full duplex operation in which the UEs and/or the base stations support full duplex operations. For example, a UE may support transmission via a first beam (e.g., using a first antenna panel) and may simultaneously support reception via a second beam (e.g., using a second antenna panel). Support for simultaneous transmission and reception may be conditional on beam separation, such as spatial separation (e.g., using different beams), frequency separation, and/or the like. Additionally, or alternatively, support for simultaneous transmission may be conditional on using beamforming (e.g., in frequency range 2 (FR2), in frequency range 4 (FR4), for millimeter wave signals, and/or the like).

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-8).

The controller/processor 240 of the base station 110, the controller/processor 280 of the UE 120, and/or any other component(s) of FIG. 2 may perform one or more techniques associated with DMRS sharing for DCI scheduling, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE 120 includes means for receiving a first configuration communication associated with a first shared channel communication that includes a first DMRS having a first configurable DMRS lifespan, wherein the first configuration communication comprises a DMRS sharing indication associated with reuse of the first DMRS associated with a second shared channel communication; means for receiving the first shared channel communication; and/or means for receiving the second shared channel communication based at least in part on the DMRS sharing indication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting a first configuration communication associated with a first shared channel communication that includes a first DMRS having a first configurable DMRS lifespan, wherein the first configuration communication comprises a DMRS sharing indication associated with reuse of the first DMRS associated with a second shared channel communication; means for transmitting the first shared channel communication; and/or means for transmitting the second shared channel communication based at least in part on the DMRS sharing indication. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A downlink channel can include a PDCCH that carries DCI, a PDSCH that carries downlink data, or a physical broadcast channel (PBCH) that carries system information, among other examples. In some cases, PDSCH communications can be scheduled by PDCCH communications. For example, a DCI can schedule one or more PDSCH communications. An uplink channel can include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 can transmit acknowledgement (ACK) or negative acknowledgement (NACK) feedback (e.g., ACK/NACK feedback or ACK/NACK information) in UCI on the PUCCH and/or the PUSCH.

Reference signals can be used to facilitate channel estimation, beam selection, and/or beamforming, among other examples. A downlink reference signal can include a synchronization signal block (SSB), a CSI-RS, a DMRS, a positioning reference signal (PRS), or a phase tracking reference signal (PTRS), among other examples. An uplink reference signal can include an SRS, a DMRS, or a PTRS, among other examples.

An SSB can carry information used for initial network acquisition and synchronization, such as a primary synchronization signal (PSS), a secondary synchronization signal (SSS), a PBCH, and a PBCH DMRS. The base station 110 can transmit multiple SSBs on multiple corresponding beams, and the SSBs can be used for beam selection.

A CSI-RS can carry information used for downlink channel estimation (e.g., downlink CSI acquisition), which can be used for scheduling, link adaptation, or beam management, among other examples. The base station 110 can configure a set of CSI-RSs for the UE 120, and the UE 120 can measure the configured set of CSI-RSs. Based at least in part on the measurements, the UE 120 can perform channel estimation and can report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or an RSRP, among other examples. The base station 110 can use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS can carry information used to estimate a radio channel for demodulation of an associated physical channel (e.g., PDCCH, PDSCH, PBCH, PUCCH, or PUSCH). The design and mapping of a DMRS can be specific to a physical channel for which the DMRS is used for estimation. DMRSs are UE-specific, can be beamformed, can be confined in a scheduled resource (e.g., rather than transmitted on a wideband), and can be transmitted only when necessary. As indicated above, DMRSs can be used for both downlink communications and uplink communications. In some cases, each PDSCH can include a DMRS that carries information used to estimate the radio channel for demodulation of the PDSCH. In some cases, a DMRS can be reused for an immediately following PDSCH. However, including DMRSs in every PDSCH or every two PDSCHs can lead to unnecessary signaling overhead. The negative impact on network performance resulting from this signaling overhead can be amplified in high frequency millimeter wave bands.

For example, the millimeter wave band of approximately 71 GHz~114.25 GHz (which may be referred to as frequency range 4 (FR4)) is often used for fixed use cases such as fixed-point-to-point or fixed-point-to-multi-point communications. In the US, this band can potentially be used for mobile use cases. As a result, the NR design in FR4 can include optimization for low and/or no mobility use cases with limited numbers of clients at large distances. In some cases, coverage can be more important than flexibility or mobility. In some cases, the effective isotropic radiated power (EIRP) limitation associated with higher millimeter wave bands (e.g., FR4) can be substantially higher than the EIRP limitation for frequency range 2-2 (FR2-2) (52.6 GHz-71 GHz). As a result, narrow beams can be more effective in meeting coverage objectives. Unnecessary signaling overhead over narrow beams (e.g., frequent transmission of DMRSs within PDSCH communications) can decrease the efficiency and effectiveness of narrow beam communication in higher frequency bands like FR4.

To increase efficiency of communication in higher bands, unnecessary signaling overhead may be reduced. Some aspects of the techniques and apparatuses described herein may facilitate downlink communications with sparse DMRS inclusion. For example, because implementations in these higher frequency bands involve fixed point or low mobility deployments over stable channels, DMRS transmission may be sparser than data transmission. To provide for sparse DMRS inclusion, some aspects facilitate buffering and reuse of DMRSs for multiple communications, whether or not the multiple communications are adjacent one another.

For example, in some aspects, a UE may receive a first configuration communication associated with a first shared channel communication that includes a first DMRS. The first configuration communication may include a DMRS sharing indication associated with reuse of the first DMRS associated with a second shared channel communication. The UE may receive the second shared channel communication based at least in part on the DMRS sharing indication. For example, based at least in part on the DMRS sharing indication, the UE may reuse the first DMRS for demodulating the second shared channel communication. As a result, some aspects of the subject matter disclosed herein may facilitate faster processing times and/or reduced signaling overhead. Some aspects may facilitate phase continuity by preventing UEs from micro-sleeping. For one or more of the above reasons and/or other reasons, some aspects of the subject matter disclosed herein may positively impact network performance.

Figure 3:
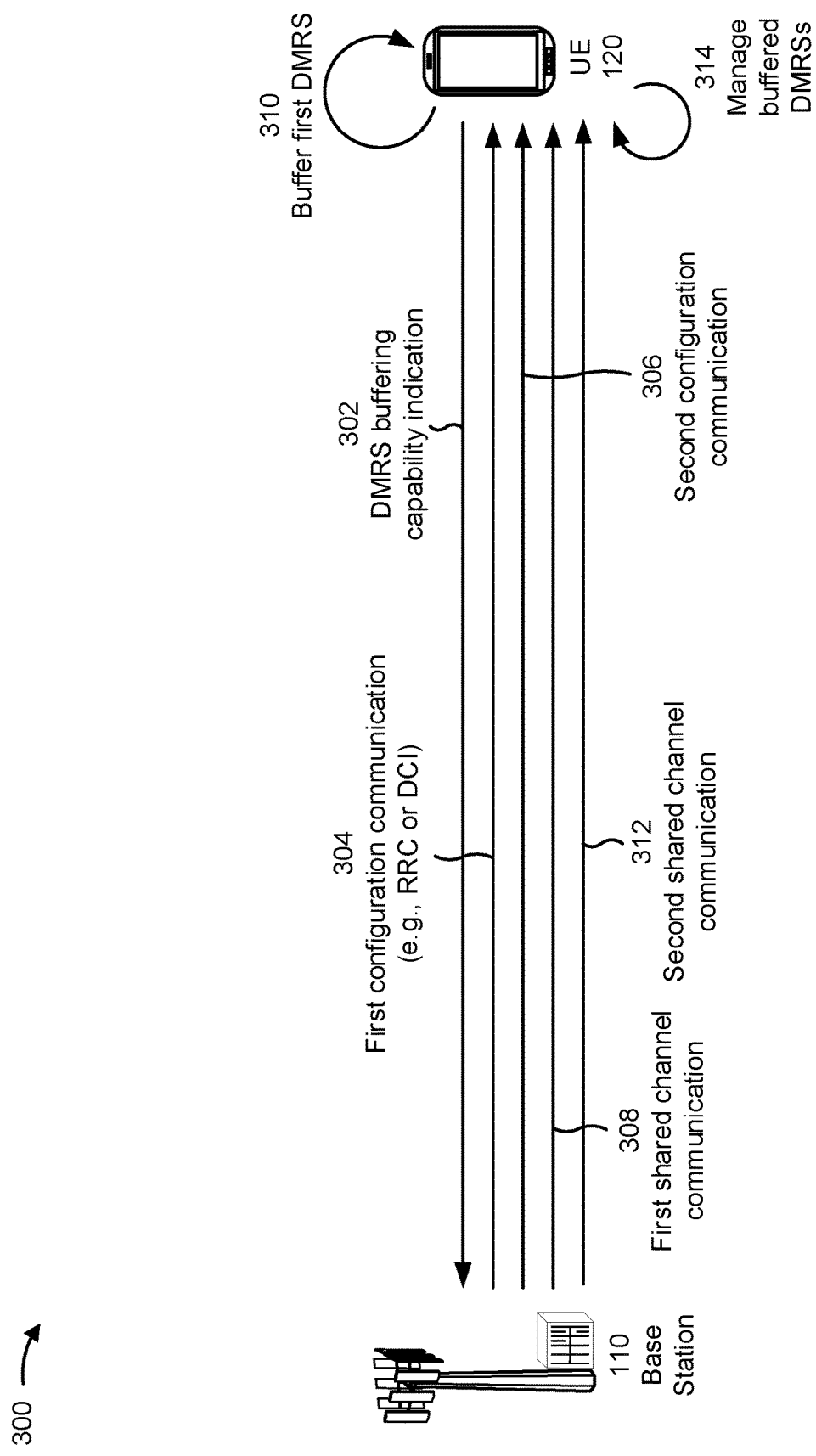
FIGS. 3 and 4 are diagrams illustrating examples associated with demodulation reference signal (DMRS) sharing for downlink control information (DCI) scheduling, in accordance with the present disclosure.

FIG. 3 is a diagram illustrating an example 300 of DMRS sharing for DCI scheduling, in accordance with the present disclosure. As shown in FIG. 3, a base station 110 and a UE 120 may communicate with one another.

As shown by reference number 302, the UE 120 may transmit, and the base station 110 may receive, a DMRS buffering capability indication. The DMRS buffering capability indication may indicate a quantity of DMRSs that the UE 120 is capable of buffering. Buffering a DMRS may include saving the DMRS, saving DMRS information associated with the DMRS, and/or indexing (e.g., associating one or more indexes with) the DMRS and/or DMRS information. In the context of buffering DMRSs, DMRS information may include the DMRS, a time domain transformation of the DMRS, a channel estimation output based at least in part on the DMRS, a weighted average of one or more channel estimation outputs, or other information determined based at least in part on one or more mathematical and/or signal processing operations applied to the DMRS, among other examples. For example, in some aspects, DMRS information may include characteristics of the DMRS such as a code sequence, a TCI state, a waveform parameter value (e.g., frequency, amplitude, phase), or a DMRS ID, among other examples.

The base station 110 may use the DMRS buffering capability indication to determine a DMRS configuration based at least in part on the quantity of DMRSs that the UE 120 is capable of buffering. In some aspects, the quantity of DMRSs that the UE 120 is capable of buffering includes a quantity of DMRSs having one or more specified configuration attributes. For example, the DMRS buffering capability indication may indicate that the UE 120 is buffering an indicated number of full-band DMRSs (e.g., DMRSs that span a bandwidth part (BWP)) having an indicated (or otherwise specified) rank. In some aspects, the quantity of DMRSs that the UE 120 is capable of buffering may include a quantity of partial-band DMRSs with a specified rank. In some aspects, the quantity of DMRSs that the UE 120 is capable of buffering may be indicated in terms of memory capacity. For example, the DMRS buffering capability indication may indicate the quantity of DMRSs that the UE 120 is capable of buffering based at least in part on indicating a memory capacity of the UE 120. The indicated memory capacity may be a total memory capacity and/or a memory capacity of a memory component configured to buffer DMRSs.

As shown by reference number 304, the base station 110 may transmit, and the UE 120 may receive, a first configuration communication. The first configuration communication may be associated with a first shared channel communication that includes a first DMRS having a first configurable DMRS lifespan. In some aspects, for example, the first configuration communication may include a radio resource control (RRC) message and/or a DCI transmission. In some aspects, the first configuration communication may include a DMRS sharing indication associated with reuse of the first DMRS associated with a second shared channel communication.

In some aspects, the DMRS sharing indication may include a first DMRS lifespan parameter value that indicates a configurable DMRS lifespan of the first DMRS. In some aspects, a DMRS configuration (e.g., an RRC configuration) may indicate a set of possible lifespan parameter values that include the first DMRS lifespan parameter value, and the first configuration communication may include a DCI transmission that includes the DMRS sharing indication. The DMRS sharing indication may indicate a first possible lifespan parameter value out of the set of possible lifespan parameter values. The lifespan of a DMRS may be a time period during which the DMRS may be reused for receiving shared channel communications. In some aspects, the lifespan may be indicated in terms of raw time measurement (e.g., milliseconds or seconds), in terms of time domain resources (e.g., symbols, subslots, or slots), and/or in terms of one or more channel and/or device conditions, among other examples. In some aspects, the UE 120 may receive the second shared channel communication using the first DMRS based at least in part on receiving the second shared channel communication within the first configurable DMRS lifespan.

In some aspects, the first DMRS lifespan parameter value may indicate that the DMRS is not to be reused (e.g., by indicating a lifespan of zero). In some aspects, for example, the UE 120 may refrain from saving DMRS information associated with the first DMRS based at least in part on the first DMRS lifespan parameter value equaling zero. In some aspects, the first DMRS lifespan parameter value may be based at least in part on a channel coherence time. In some aspects, the first DMRS lifespan parameter value may be based at least in part on a capability of the UE 120 to maintain phase continuity. In some aspects, the first configuration communication may include a storing configuration indication for storing DMRS information.

In some aspects, the first configuration communication may include a first DCI transmission, and the DMRS sharing indication may include a DMRS sharing parameter. The DMRS sharing parameter may include at least one DMRS buffering parameter, the at least one DMRS buffering parameter indicating at least one of a first DMRS presence parameter value, a first DMRS lifespan parameter value, a first DMRS ID parameter value, a first DMRS new data indicator parameter value, or a first DMRS reuse parameter value, among other examples.

As shown by reference number 306, in some aspects, the base station 110 may transmit, and the UE 120 may receive, a second configuration communication. For example, in some aspects, the first configuration communication may include an RRC message that configures DMRS sharing, and the second configuration communication may include a DCI transmission that indicates one or more DMRS sharing parameter values. In some aspects, the first configuration communication may include a first DCI transmission and the second configuration communication may include a second DCI transmission.

As shown by reference number 308, the base station 110 may transmit, and the UE 120 may receive, a first shared channel communication. The first shared channel communication may include a first DMRS. For example, in some aspects, the first DMRS may be based at least in part on a DMRS configuration indicated by the first configuration communication and/or the second configuration communication. As shown by reference number 310, the UE 120 may buffer the first DMRS. As shown by reference number 312, the base station 110 may transmit, and the UE 120 may receive, a second shared channel communication. In some aspects, the base station 110 may transmit, and the UE 120 may receive, the second shared channel communication based at least in part on the DMRS sharing indication. In some aspects, the second shared channel communication may include a dynamically-scheduled shared channel communication or a semi-persistent scheduling (SPS) shared channel communication.

The term "receive," as used herein, may refer to one or more actions performed by a reception component (e.g., the reception component 702 depicted in FIG. 7 and/or the reception component 802 depicted in FIG. 8) of a wireless communication device such as a UE 120 or a base station 110. For example, receiving a signal may include detecting the signal, demodulating the signal, transforming the signal from a time domain to a frequency domain (or vice-versa), and/or decoding the signal, among other examples. In some aspects, for example, the UE 120 may receive a communication based at least in part on a DMRS by demodulating and/or decoding the communication based on the DMRS and/or DMRS information. For example, the UE 120 may estimate the propagation channel based at least in part on the DMRS and use the estimated propagation channel to facilitate demodulating and/or decoding a communication (e.g., a shared channel communication).

Similarly, the term "transmit" may refer to one or more actions performed by a transmission component (e.g., the transmission component 704 depicted in FIG. 7 and/or the transmission component 804 depicted in FIG. 8) of a wireless communication device such as a UE 120 or a base station 110. For example, transmitting a signal may include sending the signal, modulating the signal, transforming the signal from a frequency domain to a time domain (or vice-versa), and/or encoding the signal, among other examples. In some aspects, for example, the base station 110 may transmit a communication based at least in part on a DMRS by modulating and/or encoding the communication based on the DMRS and/or DMRS information.

In some aspects, the DMRS sharing indication may indicate a DMRS sharing configuration, a DMRS lifespan value, and/or some other information based on which the UE 120 may reuse a DMRS that was received with the first shared channel communication to facilitate receiving the second shared channel communication. In this way, the second shared channel communication and/or any number of additional shared channel communications can be transmitted without including a DMRS, thereby reducing signaling and processing overhead.

In some aspects, the DMRS sharing indication may indicate that DMRS sharing is not being utilized, so that the UE 120 may expect the second shared channel communication to include a second DMRS that may be used to facilitate reception of the second shared channel communication. To facilitate reusing the first DMRS (the DMRS received with the first shared channel communication), the UE 120 may buffer the first DMRS by saving DMRS information associated with the first DMRS. The UE 120 may access the DMRS information to facilitate receiving the second shared channel configuration.

In some aspects, for example, the UE 120 may receive the first shared channel communication in a reference slot and the first DMRS lifespan parameter value may represent n−1 slots between the reference slot and a final slot of the first configurable DMRS lifespan, where n is the first DMRS lifespan parameter value. In some aspects, the UE 120 may receive the first DMRS in a reference symbol of a reference slot, where the first DMRS is a last DMRS received in the reference slot. The first DMRS lifespan parameter value may represent n−1 symbols between the reference symbol and a final symbol within the first configurable DMRS lifespan, where n is the first DMRS lifespan parameter value.

In some aspects, a DMRS may be invalidated before its lifespan expires. This occurrence also may be referred to as an early termination of the lifespan of the DMRS. In some aspects, for example, early termination may be caused by an uplink transmission (or a scheduled uplink transmission), a change in a TCI state, and/or a downlink reception gap (e.g., loss of connection to a serving cell), among other examples. In some aspects, an indication (from the base station 110) to reuse an invalidated or expired DMRS may be treated by the UE 120 as an error case.

In some aspects, the UE 120 may buffer more than one DMRS, in which case, determining a DMRS to use for receiving the second shared channel communication may be based at least in part on one or more characteristics of the second shared channel communication, the DMRSs, a DMRS index, and/or a specified rule. For example, in some aspects, the UE 120 may receive the second shared channel communication using the first DMRS based at least in part on the first DMRS having a specified characteristic. For example, the first DMRS may have the specified characteristic based at least in part on the first DMRS being a most recently received DMRS. In some aspects, the second configuration communication may include a DMRS reuse indication that indicates an association between a prior DMRS and a third shared channel communication, where the prior DMRS is not buffered by the UE 120. The UE 120 may refrain from receiving the third shared channel communication based at least in part on the prior DMRS not being buffered by the UE 120. In some aspects, the UE 120 may transmit a negative-acknowledgement feedback message based at least in part on refraining from receiving the third shared channel communication.

In some aspects, the UE 120 may receive the first shared channel communication in a reference slot, and the first DMRS may have a first DMRS configuration. The UE 120 may receive a third shared channel communication in the reference slot, where the third shared channel communication includes a second DMRS having a second DMRS configuration. The UE 120 may receive a second configuration communication that schedules the second shared channel communication, where the second configuration communication indicates a target DMRS configuration corresponding to the second shared channel communication. The UE 120 may receive, using a target DMRS, the second shared channel communication based at least in part on the target DMRS configuration matching the first DMRS configuration or the second DMRS configuration, where the target DMRS includes the first DMRS or the second DMRS. In some aspects, the UE 120 may receive, using a target DMRS, the second shared channel communication based at least in part on a DMRS configuration of the target DMRS matching the target DMRS configuration, where the target DMRS includes a DMRS out of a set of buffered DMRSs that includes the first DMRS and the second DMRS. In some aspects, the UE 120 may transmit a target DMRS feedback based at least in part on the target DMRS being buffered.

In some aspects, DMRS reuse may be facilitated using DCI signaling. For example, in some aspects, when a dynamic DCI schedules a transmission, the DCI may include a DMRS sharing parameter (e.g., DmrsShareConfiguration). The DMRS sharing parameter may include a joint encoding of a plurality of parameters. For example, the DMRS sharing parameter may include a joint encoding of a DMRS presence parameter (e.g., DmrsPresenceFlag), a DMRS life span parameter (e.g., DmrsLifeSpan), a DMRS index, a DMRS new data indicator (e.g., DmrsNdi), and/or a DMRS reuse index (e.g., DmrsToReuseIndex).

In some aspects, for example, the DMRS sharing parameter may include a first portion and a second portion. The first portion may include a first DMRS presence parameter value and the second portion may include only the first DMRS lifespan parameter value, the first DMRS ID parameter value, and the first DMRS new data indicator parameter value based at least in part on the first DMRS presence parameter value being a first specified value of a plurality of specified values. The first specified value may indicate that the first shared channel communication includes the first DMRS. In some aspects, the first DMRS presence parameter value may be the first specified value, and the UE 120 may receive a second DCI transmission that schedules the second shared channel communication and that includes an additional DMRS sharing parameter. The additional DMRS sharing parameter may include a second DMRS presence parameter value and a second DMRS reuse parameter value. The UE 120 may receive the second shared channel based at least in part on the first DMRS based at least in part on the second DMRS presence parameter value being a second specified value of the plurality of specified values, where the second specified value indicates that the second shared communication does not include a second DMRS.

In some aspects, the UE 120 may receive a second DCI transmission that schedules the second shared channel communication. The second DCI transmission may include only a second DMRS reuse parameter value based at least in part on a second DMRS presence parameter value being a first specified value of a plurality of specified values, where the first specified value indicates that the second shared channel communication does include a DMRS. In some aspects, the UE 120 may receive the second shared channel communication based at least in part on a second DMRS included in the second shared channel communication and based at least in part on the first DMRS lifespan parameter having a value of zero. In some aspects, the UE 120 may further receive an RRC message including the first DMRS lifespan parameter value, where the at least one DMRS buffering parameter does not include a DMRS lifespan parameter based at least in part on receiving the RRC message comprising the first DMRS lifespan parameter value.

In some aspects, the DMRS sharing parameter may indicate a third value that indicates that a transmission scheduled by the first configuration communication includes a DMRS. The value of the second portion of the DMRS sharing parameter may include the DMRS reuse index, which may be an index that indicates a previous DMRS channel estimation to aid ongoing transmission. The value of a third portion of the DMRS sharing parameter may include the DMRS lifespan parameter. In some aspects, if the DMRS lifespan parameter value for the first DMRS is provided by an RRC message, the UE 120 may discard the DMRS lifespan parameter value.

In some aspects, the RRC message may indicate the first DMRS lifespan parameter value, and the UE 120 may store an indication of the first DMRS lifespan parameter value. The UE 120 may overwrite the indication of the first DMRS lifespan parameter value with an indication of a second DMRS lifespan parameter value indicated by a DMRS lifespan parameter based at least in part on receiving the first configuration communication, where the first configuration communication includes the DMRS lifespan parameter, and where the DMRS lifespan parameter indicates the second DMRS lifespan parameter value.

In some aspects, the UE 120 may receive a second DCI transmission that schedules a third shared channel communication, and the second DCI transmission may include a DMRS sharing parameter that indicates that the third shared channel communication does not include a DMRS. The UE 120 may refrain from receiving the third shared channel communication based at least in part on the DMRS sharing parameter and an expiration of a most recent buffered DMRS information. In some aspects, the UE 120 may transmit a negative-acknowledgement feedback corresponding to the third shared channel based at least in part on refraining from receiving the third shared channel communication. In some aspects, the third shared channel communication may include an SPS communication, and the second DCI transmission may schedule the third shared channel communication based at least in part on indicating an activation of the SPS communication.

While implementing DMRS sharing using DCI signaling, as described above, may provide flexibility, this type of implementation also may increase overhead. In some aspects, if a communication channel is stable enough (e.g., if a stability of the communication channel satisfies a stability criterion), RRC configured DMRS sharing may be utilized. For example, in some aspects, the first configuration communication may include a first RRC message and the DMRS sharing indication may include a DMRS lifespan parameter associated with the first DMRS. The UE 120 may receive the second shared channel communication, based at least in part on the DMRS lifespan parameter having a specified DMRS lifespan parameter value, the second shared channel communication based at least in part on a second DMRS included in the second shared channel communication. In some aspects, the UE 120 may receive a first DCI transmission associated with the first shared channel communication. The first DCI transmission may include a first DMRS presence indicator that indicates that the first shared channel communication includes a first DMRS.

In some aspects, the UE 120 may receive a second DCI transmission associated with the second shared channel communication. The second DCI transmission may include a second DMRS presence indicator that indicates that the second shared channel communication does not include a second DMRS. The second DCI transmission may indicate a target DMRS, and the UE 120 may receive the second shared channel communication based at least in part on the target DMRS. In some aspects, the second DCI transmission may indicate a target DMRS configuration associated with the second shared channel communication, and the target DMRS may include a most-recently-received DMRS having a DMRS configuration that matches the target DMRS configuration. The target DMRS may be indicated by at least one of the RRC message or a wireless communication standard. In some aspects, the DMRS sharing indication may not include a DMRS lifespan parameter associated with the first DMRS, and the UE 120 may receive, based at least in part on the DMRS sharing indication not including the DMRS lifespan parameter, the second shared channel communication based at least in part on a second DMRS included in the second shared channel communication.

As shown by reference number 314, the UE 120 may manage buffered DMRSs. The UE 120 may manage buffered DMRSs by storing DMRS information, discarding (deleting) DMRS information, updating DMRS information, and/or overwriting DMRS information, among other examples. For example, in some aspects, the UE 120 may discard stored DMRS information associated with the first DMRS based at least in part on the invalidation of the first DMRS. In some aspects, the UE 120 may discard stored DMRS information associated with the first DMRS based at least in part on an expiration of the first configurable DMRS lifespan.

In some aspects, the first DMRS may have a first DMRS configuration, and the UE 120 may receive, prior to an expiration of the first configurable DMRS lifespan, at least one additional shared channel communication that includes a second DMRS. In some aspects, the UE 120 may store DMRS information associated with at least one of the first DMRS or the second DMRS. For example, the second DMRS may have a second DMRS configuration that matches the first DMRS configuration and a second configurable DMRS lifespan. The UE 120 may store DMRS information that includes a weighted average of a first channel estimation output associated with the first DMRS and a second channel estimation output associated with the second DMRS. In some aspects, the UE 120 may store a first channel estimation output associated with the first DMRS and may overwrite the first channel estimation output with a second channel estimation output associated with the second DMRS.

In some aspects, the first DMRS information may be associated with a first DMRS ID that corresponds to the first DMRS and the second DMRS information may be associated with a second DMRS ID that corresponds to the second DMRS. In some aspects, the first DMRS ID may be based at least in part on a slot in which the first DMRS is transmitted. In some aspects, the first DMRS information may be associated with a first value of a communication parameter and the second DMRS information may be associated with a second value of the communication parameter. The communication parameter may indicate at least one of a traffic classification or a channel condition. In some aspects, the UE 120 may store the first DMRS information until an expiration of the first configurable DMRS lifespan. The UE 120 may store the second DMRS information until an expiration of a second configurable DMRS lifespan associated with the second DMRS.

In some aspects, the UE 120 may determine, based at least in part on the first DMRS ID, that the first DMRS information is associated with the second shared channel communication. The UE 120 may receive the second shared channel communication based at least in part on the first DMRS information. In some aspects, the base station 110 may transmit, and the UE 120 may receive, an indication of the first DMRS ID and the second DMRS ID. In some aspects, the UE 120 may store the second DMRS information by storing, based at least in part on the first DMRS ID being associated with the second shared channel communication, a weighted average of a first channel estimation output corresponding to the first DMRS and a second channel estimation corresponding to the second DMRS. In some aspects, the UE 120 may store the second DMRS information based at least in part on associating the first DMRS ID with the second DMRS information.

In some aspects, the UE 120 may store a lifespan indication that indicates the first configurable DMRS lifespan associated with the first DMRS and may update the lifespan indication to indicate a second configurable DMRS lifespan associated with the second DMRS. In some aspects, the UE 120 may receive, from the base station, a new data indicator associated with the first DMRS ID. The UE 120 may store the first DMRS ID based at least in part on the first DMRS ID being unused regardless of the new data indicator. In some aspects, the second DMRS ID may be equal to the first DMRS ID, and the UE 120 may store the second DMRS information based at least in part on overwriting the first DMRS information with the second DMRS information based at least in part on the new data indicator being toggled. In some aspects, the second DMRS ID may be equal to the first DMRS ID, and the UE 120 may store the second DMRS information based at least in part on updating the first DMRS information with the second DMRS information based at least in part on the new data indicator not being toggled. In some aspects, therefore, the UE 120 may determine that a prior DMRS has been missed based at least in part on a first DMRS configuration associated with the first DMRS being different than a second DMRS configuration associated with the second DMRS and the new data indicator not being toggled.

As indicated above, FIG. 3 is provided as an example. Other examples may differ from what is described with respect to FIG. 3.

Figure 4:
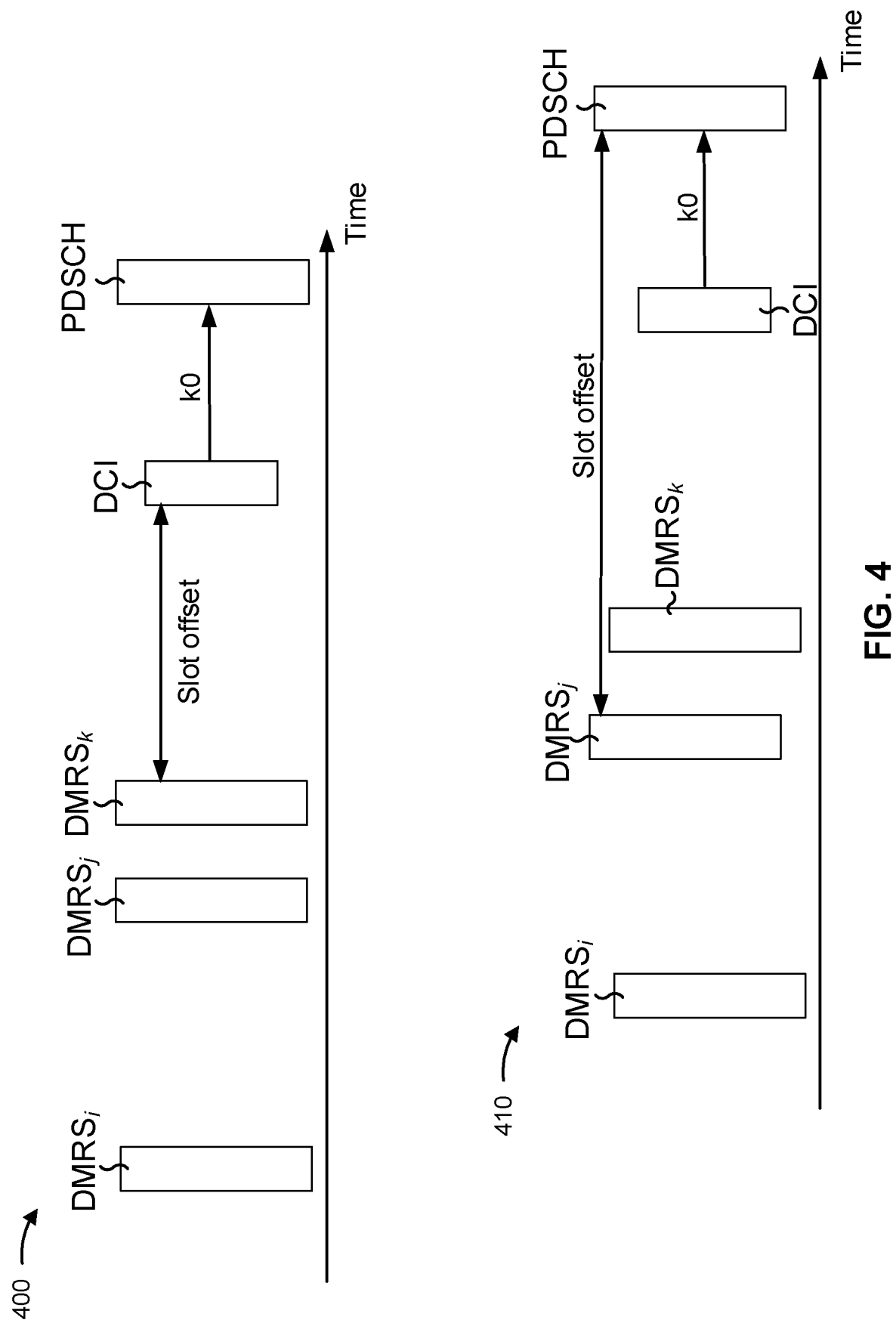

FIG. 4 is a diagram illustrating examples 400 and 410 associated with DMRS sharing for DCI scheduling, in accordance with the present disclosure.

Examples 400 and 410 depict applications of a slot offset for determining a buffered DMRS to use for receiving a shared channel communication (shown as "PDSCH"). In some aspects, the slot offset may be a subslot offset, a mini-slot offset, and/or a symbol offset, among other examples. As explained above, and shown in FIG. 4, a UE (e.g., UE 120) may receive a number of shared channel communications, each including a DMRS (shown as "$DMRS_i$," "$DMRS_j$," . . . "$DMRS_k$") and may buffer the respective DMRSs. In some aspects, the UE 120 may index the DMRSs by assigning a DMRS index to each DMRS, by associating a slot number with each DMRS, and/or by associating a reception time with each DMRS, among other examples. As shown, a scheduling DCI transmission may indicate an offset, k0, that represents an offset between the scheduling DCI and the scheduled PDSCH.

In example 400, the slot offset indicates a target DMRS ($DMRS_k$) by representing an offset between a reference slot and a target slot (e.g., a slot in which the target DMRS is received), where the reference slot is a slot in which a DCI transmission, that schedules the PDSCH, is received. In example 410, the slot offset indicates a target DMRS ($DMRS_j$) by representing an offset between a reference slot and the target slot, wherein the reference slot is a slot in which the PDSCH is to be received. The slot offset may be based at least in part on the target DMRS having a same DMRS configuration as the scheduling DCI. In some aspects, the slot offset may be based at least in part on a DMRS reuse indication transmitted in a DMRS sharing configuration. In some aspects, more than one DMRS may have a same DMRS configuration as the scheduling DCI, in which case the UE may choose a DMRS from the one or more DMRSs with that configuration. For example, in some aspects, the UE may select the most recently received DMRS.

In some aspects, for example, the UE may receive a first shared channel communication based at least in part on a first DMRS (e.g., $DMRS_k$ or $DMRS_j$) and receive, based at least in part on the first DMRS, a second shared channel communication (PDSCH) based at least in part on a slot offset corresponding to the first DMRS. The UE may receive a configuration communication (e.g., an RRC message and/or a DCI transmission) comprising a DMRS reuse indication that indicates an association between the first DMRS and the second shared channel communication. The UE may receive the second shared channel communication based at least in part on the first DMRS. In some aspects, the DMRS reuse indication may indicate a first DMRS identifier associated with the first DMRS. In some aspects, the DMRS reuse indication may include a slot offset value that indicates a slot offset from the reference slot.

The slot offset value may represent n−1 slots between the reference slot and a target slot associated with the target DMRS, where n is the slot offset value. The reference slot may include a slot in which the second configuration communication (e.g., the scheduling DCI) is received. In some aspects, the slot offset value represents n−1 slots between the reference slot and a target slot associated with the target DMRS, where n is the slot offset value. In some aspects, the second shared channel communication may be associated with a plurality of slots, and the reference slot may include a first slot of the plurality of slots or a last slot of the plurality of slots. In some aspects, the DMRS reuse indication may include a specified value, and the UE may determine the association between the first DMRS and the second shared channel communication based at least in part on the specified value.

As indicated above, FIG. 4 is provided as an example. Other examples may differ from what is described with respect to FIG. 4.

Figure 5:
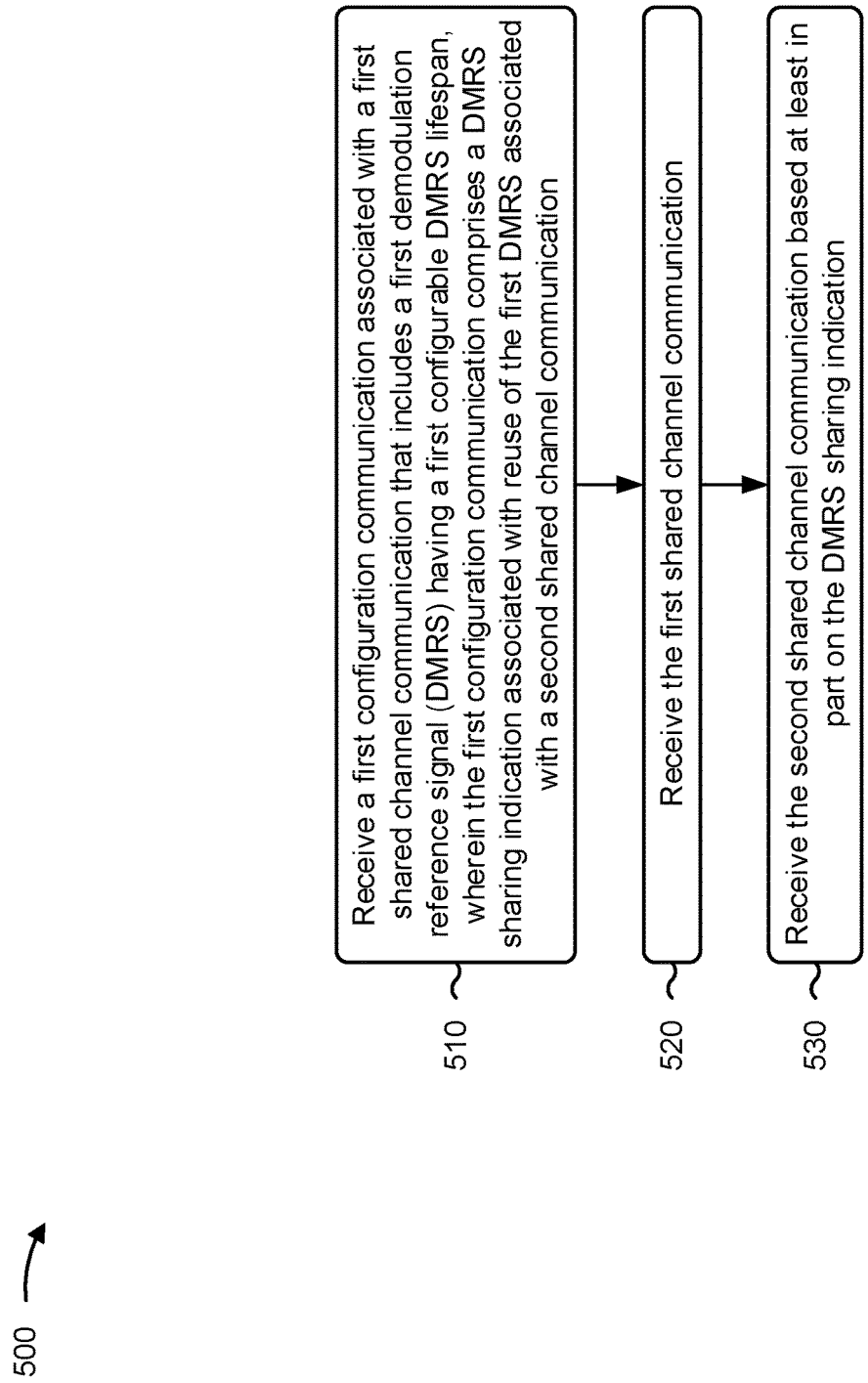
FIGS. 5 and 6 are diagrams illustrating example processes associated with DMRS sharing for DCI scheduling, in accordance with the present disclosure.

FIG. 5 is a diagram illustrating an example process 500 performed, for example, by a UE, in accordance with the present disclosure. Example process 500 is an example where the UE (e.g., UE 120) performs operations associated with DMRS sharing for DCI scheduling.

As shown in FIG. 5, in some aspects, process 500 may include receiving a first configuration communication associated with a first shared channel communication that includes a first DMRS having a first configurable DMRS lifespan, wherein the first configuration communication comprises a DMRS sharing indication associated with reuse of the first DMRS associated with a second shared channel communication (block 510). For example, the UE (e.g., using communication manager 140 and/or reception component 702, depicted in FIG. 7) may receive a first configuration communication associated with a first shared channel communication that includes a first DMRS having a first configurable DMRS lifespan, wherein the first configuration communication comprises a DMRS sharing indication associated with reuse of the first DMRS associated with a second shared channel communication, as described above.

As further shown in FIG. 5, in some aspects, process 500 may include receiving the first shared channel communication (block 520). For example, the UE (e.g., using communication manager 140 and/or reception component 702, depicted in FIG. 7) may receive the first shared channel communication, as described above.

As further shown in FIG. 5, in some aspects, process 500 may include receiving the second shared channel communication based at least in part on the DMRS sharing indication (block 530). For example, the UE (e.g., using communication manager 140 and/or reception component 702, depicted in FIG. 7) may receive the second shared channel communication based at least in part on the DMRS sharing indication, as described above.

Process 500 may include additional aspects, such as any single aspect or any combination of aspects described below and/or in connection with one or more other processes described elsewhere herein.

In some aspects, the second shared channel communication does not include a DMRS. In some aspects, the second shared channel communication comprises a dynamically-scheduled shared channel communication or a semi-persistent scheduling shared channel communication. In some aspects, process 500 includes storing DMRS information associated with the first DMRS based at least in part on the DMRS sharing indication, and receiving the second shared channel communication of the plurality of shared channel communications based at least in part on the DMRS information. In some aspects, the DMRS information comprises at least one of the first DMRS, a time domain transformation of the first DMRS, or a channel estimation output based at least in part on the first DMRS.

In some aspects, the DMRS sharing indication comprises a first DMRS lifespan parameter value that indicates the first configurable DMRS lifespan. In some aspects, receiving the second shared channel communication comprises receiving the second shared channel communication using the first DMRS based at least in part on receiving the second shared channel communication within the first configurable DMRS lifespan. In some aspects, receiving the first configuration communication comprises receiving a first DMRS configuration that includes the DMRS sharing indication, wherein the DMRS sharing indication comprises a first DMRS lifespan parameter value that indicates the first configurable DMRS lifespan, and wherein receiving the first DMRS configuration comprises receiving an RRC message that includes the first DMRS configuration. In some aspects, the first DMRS configuration indicates a set of possible lifespan parameter values that includes the first DMRS lifespan parameter value, and the DMRS sharing indication indicates a first possible lifespan parameter value of the set of possible lifespan parameter values, the first possible lifespan parameter value comprising the first DMRS lifespan parameter value.

In some aspects, the first DMRS lifespan parameter value is based at least in part on a channel coherence time. In some aspects, the first DMRS lifespan parameter value is based at least in part on a capability of the UE to maintain phase continuity. In some aspects, process 500 includes refraining from saving DMRS information associated with the first DMRS based at least in part on the first DMRS lifespan parameter value equaling zero.

In some aspects, receiving the first shared channel communication comprises receiving the first shared channel communication in a reference slot, and the first DMRS lifespan parameter value represents n−1 slots between the reference slot and a final slot of the first configurable DMRS lifespan, wherein n is the first DMRS lifespan parameter value. In some aspects, receiving the first shared channel communication comprises receiving the first DMRS in a reference symbol of a reference slot, wherein the first DMRS comprises a last DMRS received in the reference slot, and wherein the first DMRS lifespan parameter value represents n−1 symbols between the reference symbol and a final symbol within the first configurable DMRS lifespan, wherein n is the first DMRS lifespan parameter value.

In some aspects, receiving the second shared channel communication comprises receiving the second shared channel communication without using the first DMRS based at least in part on an invalidation of the first DMRS. In some aspects, the invalidation of the DMRS occurs prior to expiration of the first configurable DMRS lifespan. In some aspects, the invalidation of the first DMRS is based at least in part on at least one of a scheduled uplink transmission, a transmission configuration indicator change, or a downlink reception gap. In some aspects, process 500 includes discarding stored DMRS information associated with the first DMRS based at least in part on the invalidation of the first DMRS. In some aspects, process 500 includes discarding stored DMRS information associated with the first DMRS based at least in part on an expiration of the first configurable DMRS lifespan. In some aspects, the first DMRS has a first DMRS configuration, and process 500 further includes receiving, prior to an expiration of the first configurable DMRS lifespan, at least one additional shared channel communication that includes a second DMRS having a second DMRS configuration that matches the first DMRS configuration and having a second configurable DMRS lifespan.

In some aspects, process 500 includes storing DMRS information comprising a weighted average of a first channel estimation output associated with the first DMRS and a second channel estimation output associated with the second DMRS. In some aspects, process 500 includes storing a first channel estimation output associated with the first DMRS, and overwriting the first channel estimation output with a second channel estimation output associated with the second DMRS. In some aspects, process 500 includes storing DMRS information associated with at least one of the first DMRS or the second DMRS. In some aspects, process 500 includes receiving a storing configuration indication, wherein storing the DMRS information comprises storing the DMRS information based at least in part on the storing configuration indication. In some aspects, receiving the storing configuration indication comprises receiving at least one of a radio resource control message or a downlink control information transmission.

In some aspects, process 500 includes buffering a plurality of DMRSs, wherein buffering the plurality of DMRSs comprises storing first DMRS information corresponding to the first DMRS, wherein the first DMRS information is associated with a first DMRS ID that corresponds to the first DMRS, and storing second DMRS information corresponding to a second DMRS, wherein the second DMRS information is associated with a second DMRS ID that corresponds to the second DMRS. In some aspects, the first DMRS information is associated with a first value of a communication parameter and the second DMRS information is associated with a second value of the communication parameter. In some aspects, the communication parameter indicates at least one of a traffic classification or a channel condition. In some aspects, storing the first DMRS information comprises storing the first DMRS information until an expiration of the first configurable DMRS lifespan, and storing the second DMRS information comprises storing the second DMRS information until an expiration of a second configurable DMRS lifespan associated with the second DMRS.

In some aspects, process 500 includes determining, based at least in part on the first DMRS ID, that the first DMRS information is associated with the second shared channel communication, wherein receiving the second shared channel communication comprises receiving the second shared channel communication based at least in part on the first DMRS information. In some aspects, process 500 includes receiving, from a base station, an indication of the first DMRS ID and the second DMRS ID. In some aspects, storing the second DMRS information comprises storing, based at least in part on the first DMRS ID being associated with the second shared channel communication, a weighted average of a first channel estimation output corresponding to the first DMRS and a second channel estimation corresponding to the second DMRS. In some aspects, storing the second DMRS information comprises associating the first DMRS ID with the second DMRS information. In some aspects, process 500 includes storing a lifespan indication that indicates the first configurable DMRS lifespan associated with the first DMRS, and updating the lifespan indication to indicate a second configurable DMRS lifespan associated with the second DMRS.

In some aspects, process 500 includes receiving, from the base station, a new data indicator associated with the first DMRS ID. In some aspects, storing the first DMRS ID comprises storing the first DMRS ID based at least in part on the first DMRS ID being unused regardless of the new data indicator. In some aspects, the second DMRS ID is equal to the first DMRS ID, and storing the second DMRS information comprises overwriting the first DMRS information with the second DMRS information based at least in part on the new data indicator being toggled. In some aspects, the second DMRS ID is equal to the first DMRS ID, and storing the second DMRS information comprises updating the first DMRS information with the second DMRS information based at least in part on the new data indicator not being toggled. In some aspects, process 500 includes determining that a prior DMRS has been missed based at least in part on a first DMRS configuration associated with the first DMRS being different than a second DMRS configuration associated with the second DMRS, and the new data indicator not being toggled.

In some aspects, the first DMRS ID is based at least in part on a slot in which the first DMRS is transmitted. In some aspects, process 500 includes transmitting a DMRS buffering capability indication that indicates a quantity of DMRSs that the UE is capable of buffering. In some aspects, the quantity of DMRSs that the UE is capable of buffering comprises a quantity of DMRSs having one or more specified configuration attributes. In some aspects, the quantity of DMRSs that the UE is capable of buffering comprises a quantity of full-band DMRSs with a specified rank. In some aspects, the DMRS buffering capability indication indicates the quantity of DMRSs that the UE is capable of buffering based at least in part on indicating a memory capacity of the UE.

In some aspects, process 500 includes receiving the first shared channel communication based at least in part on the first DMRS, and receiving, based at least in part on the first DMRS, the second shared channel communication based at least in part on a slot offset corresponding to the first DMRS. In some aspects, receiving the first shared channel communication comprises receiving the first shared channel communication based at least in part on the first DMRS, and process 500 further includes receiving a second configuration communication comprising a DMRS reuse indication that indicates an association between the first DMRS and the second shared channel communication, wherein receiving the second shared channel communication comprises receiving the second shared channel communication based at least in part on the first DMRS. In some aspects, the DMRS reuse indication indicates a first DMRS identifier associated with the first DMRS. In some aspects, receiving the first shared channel communication comprises receiving the first shared channel communication in a target slot, and the DMRS reuse indication comprises a slot offset value that indicates a slot offset to the target slot from the reference slot. In some aspects, the slot offset value represents n−1 slots between the reference slot and the target slot, wherein n is the slot offset value. In some aspects, the reference slot is a slot in which the second configuration communication is received. In some aspects, the reference slot is a slot in which the second shared channel communication is received. In some aspects, the second shared channel communication is associated with a plurality of slots, and the reference slot comprises a first slot of the plurality of slots or a last slot of the plurality of slots.

In some aspects, the DMRS reuse indication comprises a specified value, and process 500 further includes determining the association between the first DMRS and the second shared channel communication based at least in part on the specified value. In some aspects, receiving the first shared channel communication comprises receiving the first shared channel communication based at least in part on the first DMRS, and receiving the second shared channel communication comprises receiving, based at least in part on the first DMRS, the second shared channel communication based at least in part on the first DMRS having a specified characteristic. In some aspects, the first DMRS has the specified characteristic based at least in part on the first DMRS being a most recently received DMRS.

In some aspects, receiving the first shared channel communication comprises receiving the first shared channel communication based at least in part on the first DMRS, and process 500 further includes receiving a second configuration communication comprising a DMRS reuse indication that indicates an association between a prior DMRS and a third shared channel communication, wherein the prior DMRS is not buffered by the UE, and refraining from receiving the third shared channel communication based at least in part on the prior DMRS not being buffered by the UE. In some aspects, process 500 includes transmitting a negative-acknowledgement feedback message based at least in part on refraining from receiving the third shared channel communication.

In some aspects, receiving the first shared channel communication comprises receiving the first shared channel communication in a reference slot, the first DMRS having a first DMRS configuration, and process 500 further includes receiving a third shared channel communication in the reference slot, wherein the third shared channel communication includes a second DMRS having a second DMRS configuration, receiving a second configuration communication that schedules the second shared channel communication, wherein the second configuration communication indicates a target DMRS configuration corresponding to the second shared channel communication, and receiving, using a target DMRS, the second shared channel communication based at least in part on the target DMRS configuration matching the first DMRS configuration or the second DMRS configuration, wherein the target DMRS comprises the first DMRS or the second DMRS.

In some aspects, receiving the first shared channel communication comprises receiving the first shared channel communication in a reference slot, the first DMRS having a first DMRS configuration, and process 500 further includes receiving a third shared channel communication in the reference slot, wherein the third shared channel communication includes a second DMRS having the first DMRS configuration, and receiving a second configuration communication that schedules the second shared channel communication, wherein the second configuration communication indicates a target DMRS configuration corresponding to the second shared channel communication, wherein receiving the second shared channel communication comprises receiving, using a target DMRS, the second shared channel communication based at least in part on a DMRS configuration of the target DMRS matching the target DMRS configuration, wherein the target DMRS comprises a DMRS of a set of buffered DMRSs that includes the first DMRS and the second DMRS. In some aspects, process 500 includes transmitting a target DMRS feedback based at least in part on the target DMRS being buffered.

In some aspects, the first configuration communication comprises a first DCI transmission, wherein the DMRS sharing indication comprises a DMRS sharing parameter, and wherein receiving the first shared channel communication comprises receiving the first shared channel communication based at least in part on the DMRS sharing parameter. In some aspects, the DMRS sharing parameter comprises at least one DMRS buffering parameter, the at least one DMRS buffering parameter indicating at least one of a first DMRS presence parameter value, a first DMRS lifespan parameter value, a first DMRS ID parameter value, a first DMRS new data indicator parameter value, or a first DMRS reuse parameter value.

In some aspects, the DMRS sharing parameter includes a first portion and a second portion, wherein the first portion includes the first DMRS presence parameter value, and wherein the second portion includes only the first DMRS lifespan parameter value, the first DMRS ID parameter value, and the first DMRS new data indicator parameter value based at least in part on the first DMRS presence parameter value being a first specified value of a plurality of specified values, wherein the first specified value indicates that the first shared channel communication includes the first DMRS. In some aspects, the first DMRS presence parameter value is the first specified value, and process 500 further includes receiving a second DCI transmission that schedules the second shared channel communication and that includes an additional DMRS sharing parameter, wherein the additional DMRS sharing parameter comprises a second DMRS presence parameter value and a second DMRS reuse parameter value.

In some aspects, receiving the second shared channel comprises receiving the second shared channel based at least in part on the first DMRS based at least in part on the second DMRS presence parameter value being a second specified value of the plurality of specified values, wherein the second specified value indicates that the second shared communication does not include a second DMRS. In some aspects, receiving the second shared channel comprises receiving the second shared channel based at least in part on the first DMRS based at least in part on the second DMRS reuse parameter value indicating the first DMRS.

In some aspects, process 500 includes receiving a second DCI transmission that schedules the second shared channel communication, the second DCI transmission comprising only a second DMRS reuse parameter value based at least in part on a second DMRS presence parameter value being a first specified value of a plurality of specified values, wherein the first specified value indicates that the second shared channel communication does not include a DMRS. In some aspects, receiving the second shared channel communication based at least in part on a second DMRS included in the second shared channel communication based at least in part on the first DMRS lifespan parameter having a value of zero.

In some aspects, process 500 includes receiving a radio resource control (RRC) message comprising the first DMRS lifespan parameter value, wherein the at least one DMRS buffering parameter does not include a DMRS lifespan parameter based at least in part on receiving the RRC message comprising the first DMRS lifespan parameter value. In some aspects, process 500 includes receiving an RRC message that indicates the first DMRS lifespan parameter value, storing an indication of the first DMRS lifespan parameter value, and overwriting the indication of the first DMRS lifespan parameter value with an indication of a second DMRS lifespan parameter value indicated by a DMRS lifespan parameter based at least in part on receiving the first configuration communication, wherein the first configuration communication includes the DMRS lifespan parameter, and wherein the DMRS lifespan parameter indicates the second DMRS lifespan parameter value.

In some aspects, process 500 includes receiving a second DCI transmission that schedules a third shared channel communication, wherein the second DCI transmission includes a DMRS sharing parameter that indicates that the third shared channel communication does not include a DMRS, and refraining from receiving the third shared channel communication based at least in part on the DMRS sharing parameter and an expiration of a most recent buffered DMRS information. In some aspects, process 500 includes transmitting a negative-acknowledgement feedback corresponding to the third shared channel based at least in part on refraining from receiving the third shared channel communication.

In some aspects, the third shared channel communication comprises an SPS communication, and the second DCI transmission schedules the third shared channel communication based at least in part on indicating an activation of the SPS communication. In some aspects, the first configuration communication comprises a first downlink control information transmission.

In some aspects, the first configuration communication comprises a first RRC message. In some aspects, the DMRS sharing indication comprises a DMRS lifespan parameter associated with the first DMRS. In some aspects, receiving the second shared channel communication comprises receiving, based at least in part on the DMRS lifespan parameter having a specified DMRS lifespan parameter value, the second shared channel communication based at least in part on a second DMRS included in the second shared channel communication. In some aspects, process 500 includes receiving a first DCI transmission associated with the first shared channel communication, the first DCI transmission comprising a first DMRS presence indicator that indicates that the first shared channel communication includes a first DMRS.

In some aspects, process 500 includes receiving a second DCI transmission associated with the second shared channel communication, the second DCI transmission comprising a second DMRS presence indicator that indicates that the second shared channel communication does not include a second DMRS, wherein the second DCI transmission indicates a target DMRS, and wherein receiving the second shared channel communication comprises receiving the second shared channel communication based at least in part on the target DMRS. In some aspects, the second DCI transmission indicates a target DMRS configuration associated with the second shared channel communication, and the target DMRS comprises a most-recently received DMRS having a DMRS configuration that matches the target DMRS configuration. In some aspects, the target DMRS is indicated by at least one of the RRC message or a wireless communication standard. In some aspects, the DMRS sharing indication does not include a DMRS lifespan parameter associated with the first DMRS, and receiving the second shared channel communication comprises receiving, based at least in part on the DMRS sharing indication not including the DMRS lifespan parameter, the second shared channel communication based at least in part on a second DMRS included in the second shared channel communication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
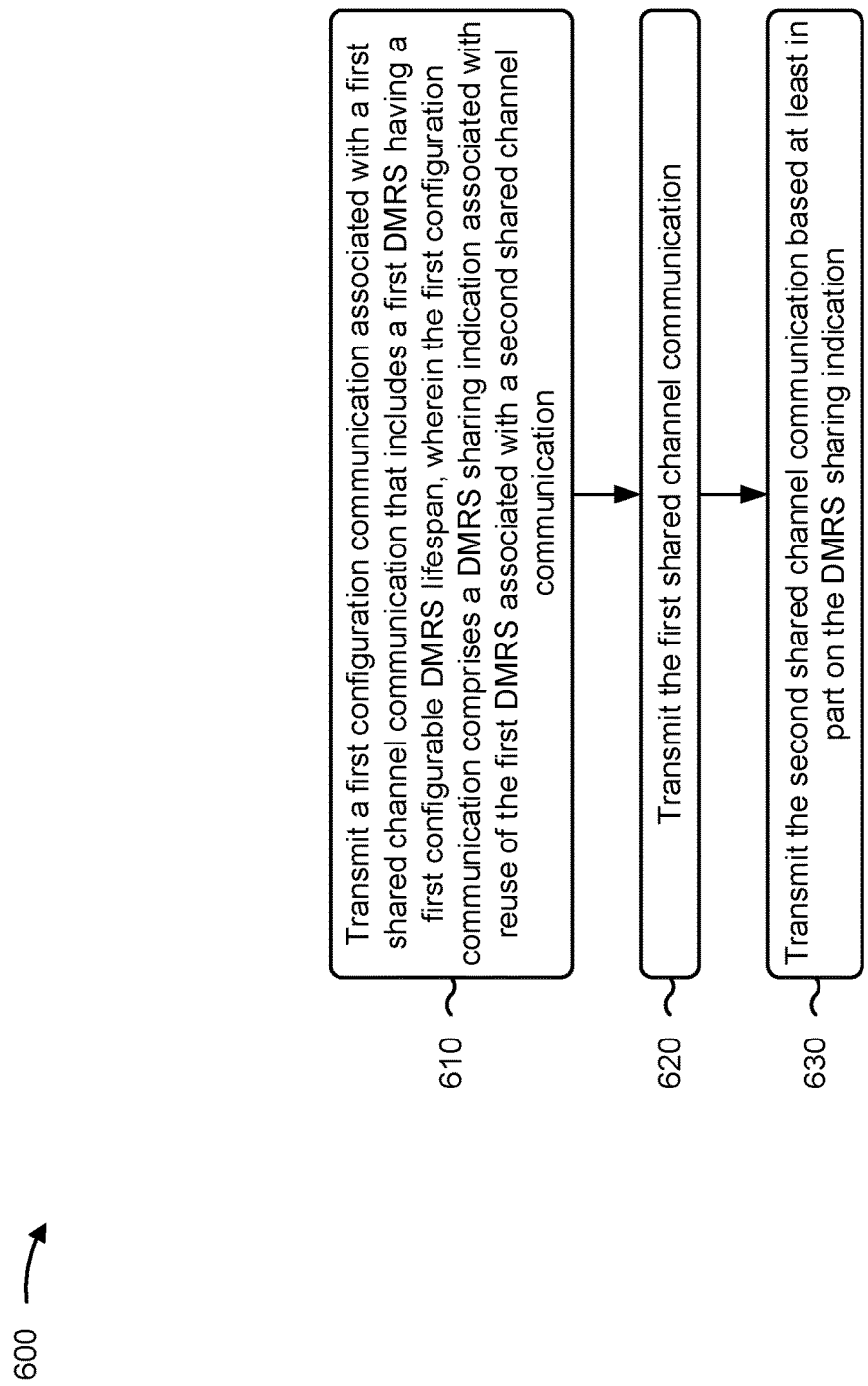

FIG. 6 is a diagram illustrating an example process 600 performed, for example, by a base station, in accordance with the present disclosure. Example process 600 is an example where the base station (e.g., base station 110) performs operations associated with DMRS sharing for DCI scheduling.

As shown in FIG. 6, in some aspects, process 600 may include transmitting a first configuration communication associated with a first shared channel communication that includes a first DMRS having a first configurable DMRS lifespan, wherein the first configuration communication comprises a DMRS sharing indication associated with reuse of the first DMRS associated with a second shared channel communication (block 610). For example, the base station (e.g., using communication manager 150 and/or transmission component 804, depicted in FIG. 8) may transmit a first configuration communication associated with a first shared channel communication that includes a first DMRS having a first configurable DMRS lifespan, wherein the first configuration communication comprises a DMRS sharing indication associated with reuse of the first DMRS associated with a second shared channel communication, as described above.

As further shown in FIG. 6, in some aspects, process 600 may include transmitting the first shared channel communication (block 620). For example, the base station (e.g., using communication manager 150 and/or transmission component 804, depicted in FIG. 8) may transmit the first shared channel communication, as described above.

As further shown in FIG. 6, in some aspects, process 600 may include transmitting the second shared channel communication based at least in part on the DMRS sharing indication (block 630). For example, the base station (e.g., using communication manager 150 and/or transmission component 804, depicted in FIG. 8) may transmit the second shared channel communication based at least in part on the DMRS sharing indication, as described above.

Process 600 may include additional aspects, such as any single aspect or any combination of aspects described below and/or in connection with one or more other processes described elsewhere herein.

In some aspects, the second shared channel communication does not include a DMRS. In some aspects, DMRS information associated with the first DMRS comprises at least one of the first DMRS, a time domain transformation of the first DMRS, or a channel estimation output based at least in part on the first DMRS. In some aspects, the second shared channel communication comprises a dynamically-scheduled shared channel communication or a semi-persistent scheduling shared channel communication.

In some aspects, the DMRS sharing indication comprises a first DMRS lifespan parameter value that indicates the first configurable DMRS lifespan. In some aspects, transmitting the second shared channel communication comprises transmitting the second shared channel communication using the first DMRS based at least in part on transmitting the second shared channel communication within the first configurable DMRS lifespan. In some aspects, transmitting the first configuration communication comprises transmitting a first DMRS configuration that includes the DMRS sharing indication, wherein the DMRS sharing indication comprises a first DMRS lifespan parameter value that indicates the first configurable DMRS lifespan, and wherein transmitting the first DMRS configuration comprises receiving an RRC message that includes the first DMRS configuration.

In some aspects, the first DMRS configuration indicates a set of possible lifespan parameter values that includes the first DMRS lifespan parameter value, and the DMRS sharing indication indicates a first possible lifespan parameter value of the set of possible lifespan parameter values, the first possible lifespan parameter value comprising the first DMRS lifespan parameter value. In some aspects, the first DMRS lifespan parameter value is based at least in part on a channel coherence time. In some aspects, the first DMRS lifespan parameter value is based at least in part on a capability of the UE to maintain phase continuity. In some aspects, transmitting the first shared channel communication comprises transmitting the first shared channel communication in a reference slot, and the first DMRS lifespan parameter value represents n−1 slots between the reference slot and a final slot of the first configurable DMRS lifespan, wherein n is the first DMRS lifespan parameter value. In some aspects, transmitting the first shared channel communication comprises transmitting the first DMRS in a reference symbol of a reference slot, wherein the first DMRS comprises a last DMRS received in the reference slot, and wherein the first DMRS lifespan parameter value represents n−1 symbols between the reference symbol and a final symbol within the first configurable DMRS lifespan, wherein n is the first DMRS lifespan parameter value.

In some aspects, transmitting the second shared channel communication comprises transmitting the second shared channel communication without using the first DMRS based at least in part on an invalidation of the first DMRS. In some aspects, the invalidation of the DMRS occurs prior to expiration of the first configurable DMRS lifespan. In some aspects, the invalidation of the first DMRS is based at least in part on at least one of a scheduled uplink transmission, a transmission configuration indicator change, or a downlink reception gap. In some aspects, the first DMRS has a first DMRS configuration, and process 600 further includes transmitting, prior to an expiration of the first configurable DMRS lifespan, at least one additional shared channel communication that includes a second DMRS having a second DMRS configuration that matches the first DMRS configuration and having a second configurable DMRS lifespan.

In some aspects, process 600 includes transmitting a storing configuration indication. In some aspects, transmitting the storing configuration indication comprises transmitting at least one of a radio resource control message or a downlink control information transmission. In some aspects, process 600 includes transmitting an indication of a first DMRS ID that corresponds to the first DMRS and a second DMRS that corresponds to a second DMRS. In some aspects, process 600 includes transmitting a new data indicator associated with the first DMRS ID. In some aspects, the first DMRS ID is based at least in part on a slot in which the first DMRS is transmitted. In some aspects, process 600 includes receiving, from a UE, a DMRS buffering capability indication that indicates a quantity of DMRSs that the UE is capable of buffering. In some aspects, the quantity of DMRSs that the UE is capable of buffering comprises a quantity of DMRSs having one or more specified configuration attributes. In some aspects, the quantity of DMRSs that the UE is capable of buffering comprises a quantity of full-band DMRSs with a specified rank. In some aspects, the DMRS buffering capability indication indicates the quantity of DMRSs that the UE is capable of buffering based at least in part on indicating a memory capacity of the UE.

In some aspects, process 600 includes transmitting the first shared channel communication based at least in part on the first DMRS, and transmitting, based at least in part on the first DMRS, the second shared channel communication based at least in part on a slot offset corresponding to the first DMRS. In some aspects, transmitting the first shared channel communication comprises transmitting the first shared channel communication based at least in part on the first DMRS, and process 600 further includes transmitting a second configuration communication comprising a DMRS reuse indication that indicates an association between the first DMRS and the second shared channel communication, wherein transmitting the second shared channel communication comprises transmitting the second shared channel communication based at least in part on the first DMRS. In some aspects, the DMRS reuse indication indicates a first DMRS identifier associated with the first DMRS.

In some aspects, transmitting the first shared channel communication comprises transmitting the first shared channel communication (and, thus, the first DMRS) in a target slot, and the DMRS reuse indication comprises a slot offset value that indicates a slot offset from a reference slot to the target slot. In some aspects, the slot offset value represents n−1 slots between the reference slot and the target slot, wherein n is the slot offset value. In some aspects, the reference slot comprises a slot in which the second configuration communication is received. In some aspects, the reference slot is a slot in which the second shared channel communication is received. In some aspects, the second shared channel communication is associated with a plurality of slots, and the reference slot comprises a first slot of the plurality of slots or a last slot of the plurality of slots. In some aspects, the DMRS reuse indication comprises a specified value, wherein the association between the first DMRS and the second shared channel communication is based at least in part on the specified value.

In some aspects, transmitting the first shared channel communication comprises transmitting the first shared channel communication based at least in part on the first DMRS, and transmitting the second shared channel communication comprises transmitting, based at least in part on the first DMRS, the second shared channel communication based at least in part on the first DMRS having a specified characteristic. In some aspects, the first DMRS has the specified characteristic based at least in part on the first DMRS being a most recently received DMRS.

In some aspects, transmitting the first shared channel communication comprises transmitting the first shared channel communication based at least in part on the first DMRS, and process 600 further includes transmitting a second configuration communication comprising a DMRS reuse indication that indicates an association between a prior DMRS and a third shared channel communication, wherein the prior DMRS is not buffered by a UE, and receiving a non-acknowledgement feedback message based at least in part on a failure of the UE to receive the third shared channel communication. In some aspects, transmitting the first shared channel communication comprises transmitting the first shared channel communication in a reference slot, the first DMRS having a first DMRS configuration, and process 600 further includes transmitting a third shared channel communication in the reference slot, wherein the third shared channel communication includes a second DMRS having a second DMRS configuration, transmitting a second configuration communication that schedules the second shared channel communication, wherein the second configuration communication indicates a target DMRS configuration corresponding to the second shared channel communication, and transmitting, using a target DMRS, the second shared channel communication based at least in part on the target DMRS configuration matching the first DMRS configuration or the second DMRS configuration, wherein the target DMRS comprises the first DMRS or the second DMRS.

In some aspects, transmitting the first shared channel communication comprises transmitting the first shared channel communication in a reference slot, the first DMRS having a first DMRS configuration, and process 600 further includes transmitting a third shared channel communication in the reference slot, wherein the third shared channel communication includes a second DMRS having the first DMRS configuration, and transmitting a second configuration communication that schedules the second shared channel communication, wherein the second configuration communication indicates a target DMRS configuration corresponding to the second shared channel communication, wherein transmitting the second shared channel communication comprises transmitting, using a target DMRS, the second shared channel communication based at least in part on a DMRS configuration of the target DMRS matching the target DMRS configuration, wherein the target DMRS comprises a DMRS of a set of buffered DMRSs that includes the first DMRS and the second DMRS. In some aspects, process 600 includes receiving a target DMRS feedback based at least in part on the target DMRS being buffered.

In some aspects, the first configuration communication comprises a first DCI transmission, wherein the DMRS sharing indication comprises a DMRS sharing parameter, and wherein transmitting the first shared channel communication comprises transmitting the first shared channel communication based at least in part on the DMRS sharing parameter. In some aspects, the DMRS sharing parameter comprises at least one DMRS buffering parameter, the at least one DMRS buffering parameter indicating at least one of a first DMRS presence parameter value, a first DMRS lifespan parameter value, a first DMRS ID parameter value, a first DMRS new data indicator parameter value, or a first DMRS reuse parameter value.

In some aspects, the DMRS sharing parameter includes a first portion and a second portion, wherein the first portion includes the first DMRS presence parameter value, and wherein the second portion includes only the first DMRS lifespan parameter value, the first DMRS ID parameter value, and the first DMRS new data indicator parameter value based at least in part on the first DMRS presence parameter value being a first specified value of a plurality of specified values, wherein the first specified value indicates that the first shared channel communication includes the first DMRS. In some aspects, the first DMRS presence parameter value is the first specified value, and process 600 further includes transmitting a second DCI transmission that schedules the second shared channel communication and that includes an additional DMRS sharing parameter, wherein the additional DMRS sharing parameter comprises a second DMRS presence parameter value and a second DMRS reuse parameter value.

In some aspects, transmitting the second shared channel comprises transmitting the second shared channel based at least in part on the first DMRS based at least in part on the second DMRS presence parameter value being a second specified value of the plurality of specified values, wherein the second specified value indicates that the second shared communication does not include a second DMRS. In some aspects, transmitting the second shared channel comprises transmitting the second shared channel based at least in part on the first DMRS based at least in part on the second DMRS reuse parameter value indicating the first DMRS. In some aspects, process 600 includes transmitting a second DCI transmission that schedules the second shared channel communication, the second DCI transmission comprising only a second DMRS reuse parameter value based at least in part on a second DMRS presence parameter value being a first specified value of a plurality of specified values, wherein the first specified value indicates that the second shared channel communication does not include a DMRS. In some aspects, transmitting the second shared channel communication comprises transmitting the second shared channel communication based at least in part on a second DMRS included in the second shared channel communication based at least in part on the first DMRS lifespan parameter having a value of zero.

In some aspects, process 600 includes transmitting an RRC message comprising the first DMRS lifespan parameter value, wherein the at least one DMRS buffering parameter does not include a DMRS lifespan parameter based at least in part on transmitting the RRC message comprising the first DMRS lifespan parameter value. In some aspects, process 600 includes transmitting a second DCI transmission that schedules a third shared channel communication, wherein the second DCI transmission includes a DMRS sharing parameter that indicates that the third shared channel communication does not include a DMRS, and receiving a non-acknowledgement feedback corresponding to the third shared channel based at least in part on a failure of the UE to receive the third shared channel communication. In some aspects, the third shared channel communication comprises an SPS communication, and the second DCI transmission schedules the third shared channel communication based at least in part on indicating an activation of the SPS communication.

In some aspects, the first configuration communication comprises a first downlink control information transmission. In some aspects, the first configuration communication comprises a first RRC message. In some aspects, the DMRS sharing indication comprises a DMRS lifespan parameter associated with the first DMRS. In some aspects, transmitting the second shared channel communication comprises transmitting, based at least in part on the DMRS lifespan parameter having a specified DMRS lifespan parameter value, the second shared channel communication based at least in part on a second DMRS included in the second shared channel communication. In some aspects, process 600 includes transmitting a first DCI transmission associated with the first shared channel communication, the first DCI transmission comprising a first DMRS presence indicator that indicates that the first shared channel communication includes a first DMRS.

In some aspects, process 600 includes transmitting a second DCI transmission associated with the second shared channel communication, the second DCI transmission comprising a second DMRS presence indicator that indicates that the second shared channel communication does not include a second DMRS, wherein the second DCI transmission indicates a target DMRS, and transmitting the second shared channel communication comprises transmitting the second shared channel communication based at least in part on the target DMRS. In some aspects, the second DCI transmission indicates a target DMRS configuration associated with the second shared channel communication, and the target DMRS comprises a most-recently-received DMRS having a DMRS configuration that matches the target DMRS configuration. In some aspects, the target DMRS is indicated by at least one of the RRC message or a wireless communication standard. In some aspects, the DMRS sharing indication does not include a DMRS lifespan parameter associated with the first DMRS, and transmitting the second shared channel communication comprises transmitting, based at least in part on the DMRS sharing indication not including the DMRS lifespan parameter, the second shared channel communication based at least in part on a second DMRS included in the second shared channel communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
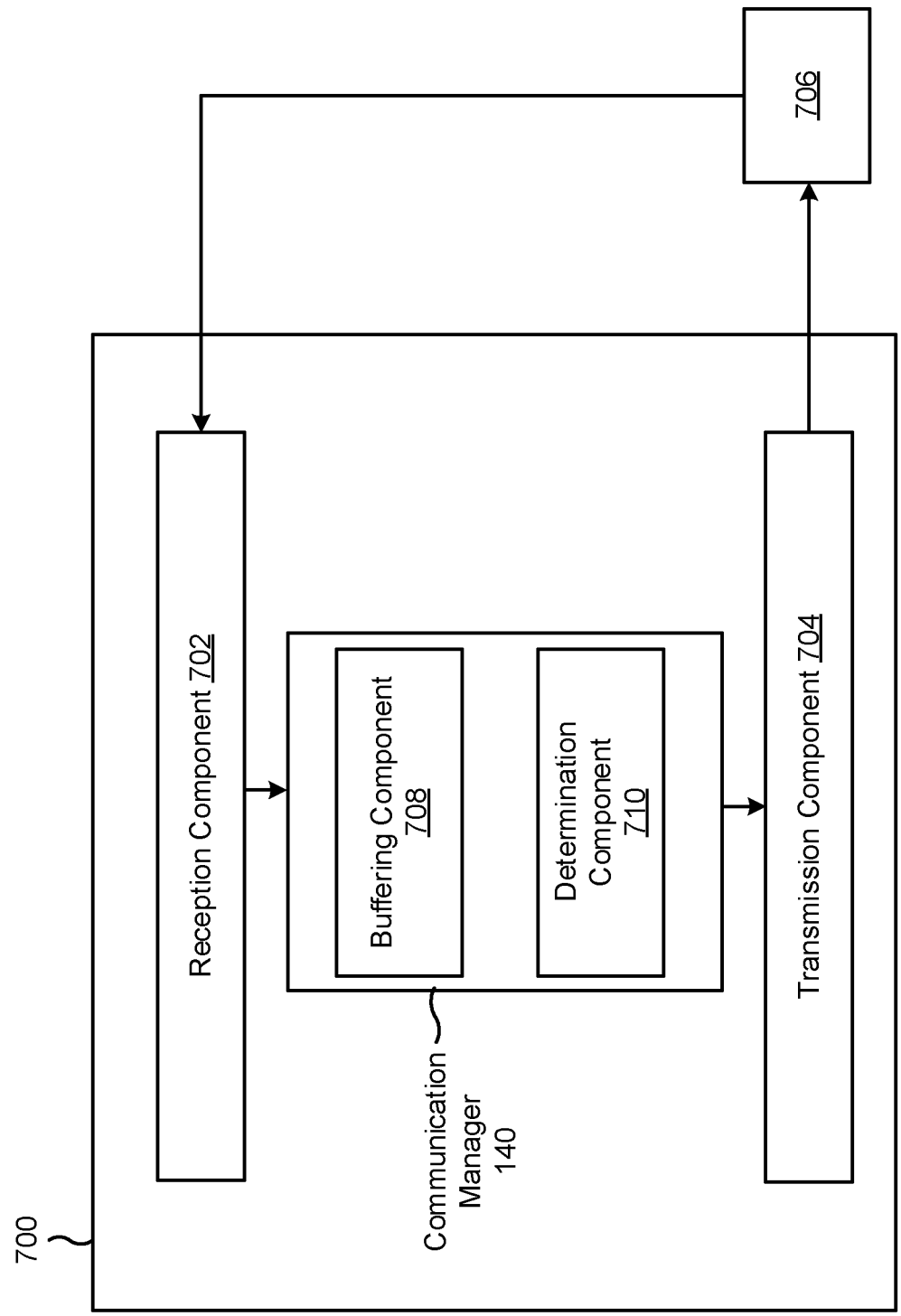
FIGS. 7 and 8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. In some aspects, the communication manager 140 may include one or more of a buffering component 708, or a determination component 710, among other examples.

In some aspects, the apparatus 700 may be configured to perform one or more operations described herein in connection with FIGS. 3 and 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The communication manager 140 may manage, control, and/or otherwise direct one or more operations of the reception component 702 and/or the transmission component 704. In some aspects, the communication manager 140 may include one or more antennas, a modem, a controller/processor, a memory, or a combination thereof, of the UE described in connection with FIG. 2. In some aspects, the communication manager 140 may include the reception component 702 and/or the transmission component 704.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive a first configuration communication associated with a first shared channel communication that includes a first DMRS having a first configurable DMRS lifespan, wherein the first configuration communication comprises a DMRS sharing indication associated with reuse of the first DMRS associated with a second shared channel communication. The reception component 702 may receive the first shared channel communication. The reception component 702 may receive the second shared channel communication based at least in part on the DMRS sharing indication.

The buffering component 708 may store DMRS information associated with the first DMRS based at least in part on the DMRS sharing indication. In some aspects, the buffering component 708 may include one or more antennas, a modem, a modulator, a transmit MIMO processor, a transmit processor, a controller/processor, a memory, or a combination thereof, of the UE described in connection with FIG. 2. In some aspects, the buffering component 708 may include one or more aspects of the reception component 702 and/or the transmission component 704.

The reception component 702 may receive the second shared channel communication of the plurality of shared channel communications based at least in part on the DMRS information. The reception component 702 may refrain from saving DMRS information associated with the first DMRS based at least in part on the first DMRS lifespan parameter value equaling zero. The buffering component 708 may discard stored DMRS information associated with the first DMRS based at least in part on the invalidation of the first DMRS. The buffering component 708 may discard stored DMRS information associated with the first DMRS based at least in part on an expiration of the first configurable DMRS lifespan.

The buffering component 708 may store DMRS information comprising a weighted average of a first channel estimation output associated with the first DMRS and a second channel estimation output associated with the second DMRS. The buffering component 708 may store a first channel estimation output associated with the first DMRS. The buffering component 708 may overwrite the first channel estimation output with a second channel estimation output associated with the second DMRS. The buffering component 708 may store DMRS information associated with at least one of the first DMRS or the second DMRS.

The reception component 702 may receive a storing configuration indication, wherein storing the DMRS information comprises storing the DMRS information based at least in part on the storing configuration indication. The buffering component 708 may buffer a plurality of DMRSs, wherein buffering the plurality of DMRSs comprises storing first DMRS information corresponding to the first DMRS, wherein the first DMRS information is associated with a first DMRS ID that corresponds to the first DMRS; and storing second DMRS information corresponding to a second DMRS, wherein the second DMRS information is associated with a second DMRS ID that corresponds to the second DMRS.

The determination component 710 may determine, based at least in part on the first DMRS ID, that the first DMRS information is associated with the second shared channel communication, wherein receiving the second shared channel communication comprises receiving the second shared channel communication based at least in part on the first DMRS information. In some aspects, the determination component 710 may include one or more antennas, a modem, a demodulator, a MIMO detector, a receive processor, a controller/processor, a memory, or a combination thereof, of the UE described in connection with FIG. 2. In some aspects, the determination component 710 may include the reception component 702 and/or the transmission component 704.

The reception component 702 may receive, from a base station, an indication of the first DMRS ID and the second DMRS ID. The buffering component 708 may store a lifespan indication that indicates the first configurable DMRS lifespan associated with the first DMRS. The buffering component 708 may update the lifespan indication to indicate a second configurable DMRS lifespan associated with the second DMRS.

The reception component 702 may receive, from the base station, a new data indicator associated with the first DMRS ID. The determination component 710 may determine that a prior DMRS has been missed based at least in part on a first DMRS configuration associated with the first DMRS being different than a second DMRS configuration associated with the second DMRS; and the new data indicator not being toggled.

The transmission component 704 may transmit a DMRS buffering capability indication that indicates a quantity of DMRSs that the UE is capable of buffering. The reception component 702 may receive the first shared channel communication based at least in part on the first DMRS. The reception component 702 may receive, based at least in part on the first DMRS, the second shared channel communication based at least in part on a slot offset corresponding to the first DMRS. The transmission component 704 may transmit a non-acknowledgement feedback message based at least in part on refraining from receiving the third shared channel communication. The transmission component 704 may transmit a target DMRS feedback based at least in part on the target DMRS being buffered.

The reception component 702 may receive a second DCI transmission that schedules the second shared channel communication, the second DCI transmission comprising only a second DMRS reuse parameter value based at least in part on a second DMRS presence parameter value being a first specified value of a plurality of specified values, wherein the first specified value indicates that the second shared channel communication does not include a DMRS. The reception component 702 may receive an RRC message comprising the first DMRS lifespan parameter value, wherein the at least one DMRS buffering parameter does not include a DMRS lifespan parameter based at least in part on receiving the RRC message comprising the first DMRS lifespan parameter value. The reception component 702 may receive an RRC message that indicates the first DMRS lifespan parameter value.

The buffering component 708 may store an indication of the first DMRS lifespan parameter value. The buffering component 708 may overwrite the indication of the first DMRS lifespan parameter value with an indication of a second DMRS lifespan parameter value indicated by a DMRS lifespan parameter based at least in part on receiving the first configuration communication, wherein the first configuration communication includes the DMRS lifespan parameter, and the DMRS lifespan parameter indicates the second DMRS lifespan parameter value. The reception component 702 may receive a second DCI transmission that schedules a third shared channel communication, wherein the second DCI transmission includes a DMRS sharing parameter that indicates that the third shared channel communication does not include a DMRS.

The communication manager 140 and/or the reception component 702 may refrain from receiving the third shared channel communication based at least in part on the DMRS sharing parameter and an expiration of a most recent buffered DMRS information. The transmission component 704 may transmit a non-acknowledgement feedback corresponding to the third shared channel based at least in part on refraining from receiving the third shared channel communication. The reception component 702 may receive a first DCI transmission associated with the first shared channel communication, the first DCI transmission comprising a first DMRS presence indicator that indicates that the first shared channel communication includes a first DMRS. The reception component 702 may receive a second DCI transmission associated with the second shared channel communication, the second DCI transmission comprising a second DMRS presence indicator that indicates that the second shared channel communication does not include a second DMRS, wherein the second DCI transmission indicates a target DMRS, and receiving the second shared channel communication comprises receiving the second shared channel communication based at least in part on the target DMRS.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
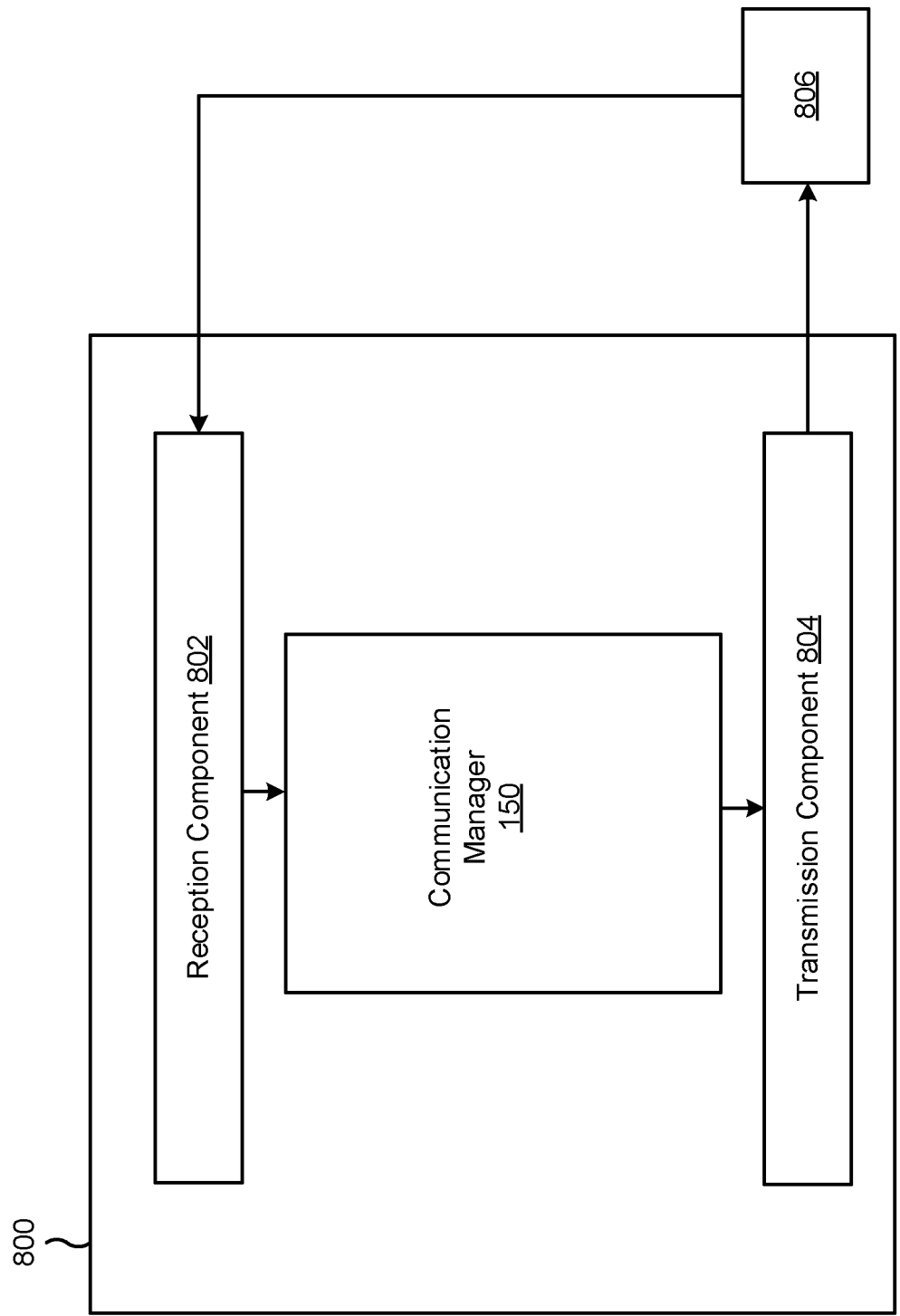

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150.

In some aspects, the apparatus 800 may be configured to perform one or more operations described herein in connection with FIGS. 3 and 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The communication manager 150 may manage, control, and/or otherwise direct one or more operations of the reception component 802 and/or the transmission component 804. In some aspects, the communication manager 150 may include one or more antennas, a modem, a controller/processor, a memory, or a combination thereof, of the base station described in connection with FIG. 2. In some aspects, the communication manager 150 may include the reception component 802 and/or the transmission component 804.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit a first configuration communication associated with a first shared channel communication that includes a first DMRS having a first configurable DMRS lifespan, wherein the first configuration communication comprises a DMRS sharing indication associated with reuse of the first DMRS associated with a second shared channel communication. The transmission component 804 may transmit the first shared channel communication. The transmission component 804 may transmit the second shared channel communication based at least in part on the DMRS sharing indication. The transmission component 804 may transmit a storing configuration indication.

The transmission component 804 may transmit an indication of a first DMRS ID that corresponds to the first DMRS and a second DMRS that corresponds to a second DMRS. The transmission component 804 may transmit a new data indicator associated with the first DMRS ID. The reception component 802 may receive, from a UE, a DMRS buffering capability indication that indicates a quantity of DMRSs that the UE is capable of buffering.

The transmission component 804 may transmit the first shared channel communication based at least in part on the first DMRS. The transmission component 804 may transmit, based at least in part on the first DMRS, the second shared channel communication based at least in part on a slot offset corresponding to the first DMRS. The reception component 802 may receive a target DMRS feedback based at least in part on the target DMRS being buffered.

The transmission component 804 may transmit a second DCI transmission that schedules the second shared channel communication, the second DCI transmission comprising only a second DMRS reuse parameter value based at least in part on a second DMRS presence parameter value being a first specified value of a plurality of specified values, wherein the first specified value indicates that the second shared channel communication does not include a DMRS. The transmission component 804 may transmit an RRC message comprising the first DMRS lifespan parameter value, wherein the at least one DMRS buffering parameter does not include a DMRS lifespan parameter based at least in part on transmitting the RRC message comprising the first DMRS lifespan parameter value.

The transmission component 804 may transmit a second DCI transmission that schedules a third shared channel communication, wherein the second DCI transmission includes a DMRS sharing parameter that indicates that the third shared channel communication does not include a DMRS. The reception component 802 may receive a non-acknowledgement feedback corresponding to the third shared channel based at least in part on a failure of the UE to receive the third shared channel communication.

The transmission component 804 may transmit a first DCI transmission associated with the first shared channel communication, the first DCI transmission comprising a first DMRS presence indicator that indicates that the first shared channel communication includes a first DMRS. The transmission component 804 may transmit a second DCI transmission associated with the second shared channel communication, the second DCI transmission comprising a second DMRS presence indicator that indicates that the second shared channel communication does not include a second DMRS, wherein the second DCI transmission indicates a target DMRS, and transmitting the second shared channel communication comprises transmitting the second shared channel communication based at least in part on the target DMRS.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a first configuration communication associated with a first shared channel communication that includes a first demodulation reference signal (DMRS) having a first configurable DMRS lifespan, wherein the first configuration communication comprises a DMRS sharing indication associated with reuse of the first DMRS associated with a second shared channel communication; receiving the first shared channel communication; and receiving the second shared channel communication based at least in part on the DMRS sharing indication.

Aspect 2: The method of Aspect 1, wherein the second shared channel communication does not include a DMRS.

Aspect 3: The method of either of Aspects 1 or 2, further comprising: storing DMRS information associated with the first DMRS based at least in part on the DMRS sharing indication; and receiving the second shared channel communication of the plurality of shared channel communications based at least in part on the DMRS information.

Aspect 4: The method of Aspect 3, wherein the DMRS information comprises at least one of: the first DMRS, a time domain transformation of the first DMRS, or a channel estimation output based at least in part on the first DMRS.

Aspect 5: The method of Aspect 4, wherein the second shared channel communication comprises a dynamically-scheduled shared channel communication or a semi-persistent scheduling shared channel communication.

Aspect 6: The method of any of Aspects 1-5, wherein the DMRS sharing indication comprises a first DMRS lifespan parameter value that indicates the first configurable DMRS lifespan.

Aspect 7: The method of Aspect 6, wherein receiving the second shared channel communication comprises receiving the second shared channel communication using the first DMRS based at least in part on receiving the second shared channel communication within the first configurable DMRS lifespan.

Aspect 8: The method of any of Aspects 1-7, wherein receiving the first configuration communication comprises receiving a first DMRS configuration that includes the DMRS sharing indication, wherein the DMRS sharing indication comprises a first DMRS lifespan parameter value that indicates the first configurable DMRS lifespan, and wherein receiving the first DMRS configuration comprises receiving a radio resource control (RRC) message that includes the first DMRS configuration.

Aspect 9: The method of Aspect 8, wherein the first DMRS configuration indicates a set of possible lifespan parameter values that includes the first DMRS lifespan parameter value, and wherein the DMRS sharing indication indicates a first possible lifespan parameter value of the set of possible lifespan parameter values, the first possible lifespan parameter value comprising the first DMRS lifespan parameter value.

Aspect 10: The method of either of Aspects 8 or 9, wherein the first DMRS lifespan parameter value is based at least in part on a channel coherence time.

Aspect 11: The method of any of Aspects 8-10, wherein the first DMRS lifespan parameter value is based at least in part on a capability of the UE to maintain phase continuity.

Aspect 12: The method of any of Aspects 8-11, further comprising refraining from saving DMRS information associated with the first DMRS based at least in part on the first DMRS lifespan parameter value equaling zero.

Aspect 13: The method of any of Aspects 8-12, wherein receiving the first shared channel communication comprises receiving the first shared channel communication in a reference slot, and wherein the first DMRS lifespan parameter value represents n−1 slots between the reference slot and a final slot of the first configurable DMRS lifespan, wherein n is the first DMRS lifespan parameter value.

Aspect 14: The method of any of Aspects 8-13, wherein receiving the first shared channel communication comprises receiving the first DMRS in a reference symbol of a reference slot, wherein the first DMRS comprises a last DMRS received in the reference slot, and wherein the first DMRS lifespan parameter value represents n−1 symbols between the reference symbol and a final symbol within the first configurable DMRS lifespan, wherein n is the first DMRS lifespan parameter value.

Aspect 15: The method of any of Aspects 8-14, wherein receiving the second shared channel communication comprises receiving the second shared channel communication without using the first DMRS based at least in part on an invalidation of the first DMRS.

Aspect 16: The method of Aspect 15, wherein the invalidation of the DMRS occurs prior to expiration of the first configurable DMRS lifespan.

Aspect 17: The method of either of Aspects 15 or 16, wherein the invalidation of the first DMRS is based at least in part on at least one of: a scheduled uplink transmission, a transmission configuration indicator change, or a downlink reception gap.

Aspect 18: The method of any of Aspects 15-17, further comprising discarding stored DMRS information associated with the first DMRS based at least in part on the invalidation of the first DMRS.

Aspect 19: The method of any of Aspects 8-18, further comprising discarding stored DMRS information associated with the first DMRS based at least in part on an expiration of the first configurable DMRS lifespan.

Aspect 20: The method of any of Aspects 8-19, wherein the first DMRS has a first DMRS configuration, the method further comprising receiving, prior to an expiration of the first configurable DMRS lifespan, at least one additional shared channel communication that includes a second DMRS having a second DMRS configuration that matches the first DMRS configuration and having a second configurable DMRS lifespan.

Aspect 21: The method of Aspect 20, further comprising storing DMRS information comprising a weighted average of a first channel estimation output associated with the first DMRS and a second channel estimation output associated with the second DMRS.

Aspect 22: The method of either of Aspects 20 or 21, further comprising: storing a first channel estimation output associated with the first DMRS; and overwriting the first channel estimation output with a second channel estimation output associated with the second DMRS.

Aspect 23: The method of any of Aspects 20-22, further comprising storing DMRS information associated with at least one of the first DMRS or the second DMRS.

Aspect 24: The method of Aspect 23, further comprising receiving a storing configuration indication, wherein storing the DMRS information comprises storing the DMRS information based at least in part on the storing configuration indication.

Aspect 25: The method of Aspect 24, wherein receiving the storing configuration indication comprises receiving at least one of a radio resource control message or a downlink control information transmission.

Aspect 26: The method of any of Aspects 1-25, further comprising buffering a plurality of DMRSs, wherein buffering the plurality of DMRSs comprises: storing first DMRS information corresponding to the first DMRS, wherein the first DMRS information is associated with a first DMRS identifier (ID) that corresponds to the first DMRS; and storing second DMRS information corresponding to a second DMRS, wherein the second DMRS information is associated with a second DMRS ID that corresponds to the second DMRS.

Aspect 27: The method of Aspect 26, wherein the first DMRS information is associated with a first value of a communication parameter and wherein the second DMRS information is associated with a second value of the communication parameter.

Aspect 28: The method of Aspect 27, wherein the communication parameter indicates at least one of a traffic classification or a channel condition.

Aspect 29: The method of any of Aspects 26-28, wherein storing the first DMRS information comprises storing the first DMRS information until an expiration of the first configurable DMRS lifespan, and wherein storing the second DMRS information comprises storing the second DMRS information until an expiration of a second configurable DMRS lifespan associated with the second DMRS.

Aspect 30: The method of any of Aspects 26-29, the method further comprising determining, based at least in part on the first DMRS ID, that the first DMRS information is associated with the second shared channel communication, wherein receiving the second shared channel communication comprises receiving the second shared channel communication based at least in part on the first DMRS information.

Aspect 31: The method of any of Aspects 26-30, further comprising receiving, from a base station, an indication of the first DMRS ID and the second DMRS ID.

Aspect 32: The method of Aspect 31, wherein storing the second DMRS information comprises storing, based at least in part on the first DMRS ID being associated with the second shared channel communication, a weighted average of a first channel estimation output corresponding to the first DMRS and a second channel estimation corresponding to the second DMRS.

Aspect 33: The method of either of Aspects 31 or 32, wherein storing the second DMRS information comprises associating the first DMRS ID with the second DMRS information.

Aspect 34: The method of Aspect 33, further comprising: storing a lifespan indication that indicates the first configurable DMRS lifespan associated with the first DMRS; and updating the lifespan indication to indicate a second configurable DMRS lifespan associated with the second DMRS.

Aspect 35: The method of any of Aspects 31-34, further comprising receiving, from the base station, a new data indicator associated with the first DMRS ID.

Aspect 36: The method of Aspect 35, wherein storing the first DMRS ID comprises storing the first DMRS ID based at least in part on the first DMRS ID being unused regardless of the new data indicator.

Aspect 37: The method of either of Aspects 35 or 36, wherein the second DMRS ID is equal to the first DMRS ID, and wherein storing the second DMRS information comprises overwriting the first DMRS information with the second DMRS information based at least in part on the new data indicator being toggled.

Aspect 38: The method of either of Aspects 35 or 36, wherein the second DMRS ID is equal to the first DMRS ID, and wherein storing the second DMRS information comprises updating the first DMRS information with the second DMRS information based at least in part on the new data indicator not being toggled.

Aspect 39: The method of Aspect 38, further comprising determining that a prior DMRS has been missed based at least in part on: a first DMRS configuration associated with the first DMRS being different than a second DMRS configuration associated with the second DMRS; and the new data indicator not being toggled.

Aspect 40: The method of any of Aspects 26-39, wherein the first DMRS ID is based at least in part on a slot in which the first DMRS is transmitted.

Aspect 41: The method of any of Aspects 1-40, further comprising transmitting a DMRS buffering capability indication that indicates a quantity of DMRSs that the UE is capable of buffering.

Aspect 42: The method of Aspect 41, wherein the quantity of DMRSs that the UE is capable of buffering comprises a quantity of DMRSs having one or more specified configuration attributes.

Aspect 43: The method of either of Aspects 41 or 42, wherein the quantity of DMRSs that the UE is capable of buffering comprises a quantity of full-band DMRSs with a specified rank.

Aspect 44: The method of any of Aspects 41-43, wherein the DMRS buffering capability indication indicates the quantity of DMRSs that the UE is capable of buffering based at least in part on indicating a memory capacity of the UE.

Aspect 45: The method of any of Aspects 1-44, further comprising: receiving the first shared channel communication based at least in part on the first DMRS; and receiving, based at least in part on the first DMRS, the second shared channel communication based at least in part on a slot offset corresponding to the first DMRS.

Aspect 46: The method of any of Aspects 1-45, wherein receiving the first shared channel communication comprises receiving the first shared channel communication based at least in part on the first DMRS, the method further comprising receiving a second configuration communication comprising a DMRS reuse indication that indicates an association between the first DMRS and the second shared channel communication, wherein receiving the second shared channel communication comprises receiving the second shared channel communication based at least in part on the first DMRS.

Aspect 47: The method of Aspect 46, wherein the DMRS reuse indication indicates a first DMRS identifier associated with the first DMRS.

Aspect 48: The method of either of Aspects 46 or 47, wherein receiving the first shared channel communication comprises receiving the first shared channel communication in a target slot, and wherein the DMRS reuse indication comprises a slot offset value that indicates a slot offset from a reference slot to the target slot.

Aspect 49: The method of Aspect 48, wherein the slot offset value represents n−1 slots between the reference slot and the target slot, wherein n is the slot offset value.

Aspect 50: The method of Aspect 48, wherein the reference slot comprises a slot in which the second configuration communication is received or a slot in which the second shared channel communication is received.

Aspect 51: The method of Aspect 50, wherein the second shared channel communication is associated with a plurality of slots, and wherein the reference slot comprises a first slot of the plurality of slots or a last slot of the plurality of slots.

Aspect 52: The method of any of Aspects 48-51, wherein the DMRS reuse indication comprises a specified value, the method further comprising determining the association between the first DMRS and the second shared channel communication based at least in part on the specified value.

Aspect 53: The method of any of Aspects 1-52, wherein receiving the first shared channel communication comprises receiving the first shared channel communication based at least in part on the first DMRS, and wherein receiving the second shared channel communication comprises receiving, based at least in part on the first DMRS, the second shared channel communication based at least in part on the first DMRS having a specified characteristic.

Aspect 54: The method of Aspect 53, wherein the first DMRS has the specified characteristic based at least in part on the first DMRS being a most recently received DMRS.

Aspect 55: The method of any of Aspects 1-54, wherein receiving the first shared channel communication comprises receiving the first shared channel communication based at least in part on the first DMRS, the method further comprising: receiving a second configuration communication comprising a DMRS reuse indication that indicates an association between a prior DMRS and a third shared channel communication, wherein the prior DMRS is not buffered by the UE; and refraining from receiving the third shared channel communication based at least in part on the prior DMRS not being buffered by the UE.

Aspect 56: The method of Aspect 55, further comprising transmitting a non-acknowledgement feedback message based at least in part on refraining from receiving the third shared channel communication.

Aspect 57: The method of any of Aspects 1-56, wherein receiving the first shared channel communication comprises receiving the first shared channel communication in a reference slot, the first DMRS having a first DMRS configuration, the method further comprising: receiving a third shared channel communication in the reference slot, wherein the third shared channel communication includes a second DMRS having a second DMRS configuration; receiving a second configuration communication that schedules the second shared channel communication, wherein the second configuration communication indicates a target DMRS configuration corresponding to the second shared channel communication; and receiving, using a target DMRS, the second shared channel communication based at least in part on the target DMRS configuration matching the first DMRS configuration or the second DMRS configuration, wherein the target DMRS comprises the first DMRS or the second DMRS.

Aspect 58: The method of any of Aspects 1-56, wherein receiving the first shared channel communication comprises receiving the first shared channel communication in a reference slot, the first DMRS having a first DMRS configuration, the method further comprising: receiving a third shared channel communication in the reference slot, wherein the third shared channel communication includes a second DMRS having the first DMRS configuration; and receiving a second configuration communication that schedules the second shared channel communication, wherein the second configuration communication indicates a target DMRS configuration corresponding to the second shared channel communication, wherein receiving the second shared channel communication comprises receiving, using a target DMRS, the second shared channel communication based at least in part on a DMRS configuration of the target DMRS matching the target DMRS configuration, wherein the target DMRS comprises a DMRS of a set of buffered DMRSs that includes the first DMRS and the second DMRS.

Aspect 59: The method of Aspect 58, further comprising transmitting a target DMRS feedback based at least in part on the target DMRS being buffered.

Aspect 60: The method of any of Aspects 1-59, wherein the first configuration communication comprises a first downlink control information (DCI) transmission, wherein the DMRS sharing indication comprises a DMRS sharing parameter, and wherein receiving the first shared channel communication comprises receiving the first shared channel communication based at least in part on the DMRS sharing parameter.

Aspect 61: The method of Aspect 60, wherein the DMRS sharing parameter comprises at least one DMRS buffering parameter, the at least one DMRS buffering parameter indicating at least one of: a first DMRS presence parameter value, a first DMRS lifespan parameter value, a first DMRS identifier (ID) parameter value, a first DMRS new data indicator parameter value, or a first DMRS reuse parameter value.

Aspect 62: The method of Aspect 61, wherein the DMRS sharing parameter includes a first portion and a second portion, wherein the first portion includes the first DMRS presence parameter value, and wherein the second portion includes: only the first DMRS lifespan parameter value, the first DMRS ID parameter value, and the first DMRS new data indicator parameter value based at least in part on the first DMRS presence parameter value being a first specified value of a plurality of specified values, wherein the first specified value indicates that the first shared channel communication includes the first DMRS.

Aspect 63: The method of Aspect 62, wherein the first DMRS presence parameter value is the first specified value, the method further comprising receiving a second DCI transmission that schedules the second shared channel communication and that includes an additional DMRS sharing parameter, wherein the additional DMRS sharing parameter comprises a second DMRS presence parameter value and a second DMRS reuse parameter value.

Aspect 64: The method of Aspect 63, wherein receiving the second shared channel comprises receiving the second shared channel based at least in part on the first DMRS based at least in part on the second DMRS presence parameter value being a second specified value of the plurality of specified values, wherein the second specified value indicates that the second shared communication does not include a second DMRS.

Aspect 65: The method of Aspect 64, wherein receiving the second shared channel comprises receiving the second shared channel based at least in part on the first DMRS based at least in part on the second DMRS reuse parameter value indicating the first DMRS.

Aspect 66: The method of any of Aspects 61-65, further comprising receiving a second DCI transmission that schedules the second shared channel communication, the second DCI transmission comprising only a second DMRS reuse parameter value based at least in part on a second DMRS presence parameter value being a first specified value of a plurality of specified values, wherein the first specified value indicates that the second shared channel communication does not include a DMRS.

Aspect 67: The method of any of Aspects 61-66, wherein receiving the second shared channel communication based at least in part on a second DMRS included in the second shared channel communication based at least in part on the first DMRS lifespan parameter having a value of zero.

Aspect 68: The method of any of Aspects 61-67, further comprising receiving a radio resource control (RRC) message comprising the first DMRS lifespan parameter value, wherein the at least one DMRS buffering parameter does not include a DMRS lifespan parameter based at least in part on receiving the RRC message comprising the first DMRS lifespan parameter value.

Aspect 69: The method of any of Aspects 61-68, further comprising: receiving a radio resource control (RRC) message that indicates the first DMRS lifespan parameter value; storing an indication of the first DMRS lifespan parameter value; and overwriting the indication of the first DMRS lifespan parameter value with an indication of a second DMRS lifespan parameter value indicated by a DMRS lifespan parameter based at least in part on receiving the first configuration communication, wherein the first configuration communication includes the DMRS lifespan parameter, and wherein the DMRS lifespan parameter indicates the second DMRS lifespan parameter value.

Aspect 70: The method of any of Aspects 61-69, further comprising: receiving a second DCI transmission that schedules a third shared channel communication, wherein the second DCI transmission includes a DMRS sharing parameter that indicates that the third shared channel communication does not include a DMRS; and refraining from receiving the third shared channel communication based at least in part on the DMRS sharing parameter and an expiration of a most recent buffered DMRS information.

Aspect 71: The method of Aspect 70, further comprising transmitting a non-acknowledgement feedback corresponding to the third shared channel based at least in part on refraining from receiving the third shared channel communication.

Aspect 72: The method of either of Aspects 70 or 71, wherein the third shared channel communication comprises a semi-persistent scheduling (SPS) communication, and wherein the second DCI transmission schedules the third shared channel communication based at least in part on indicating an activation of the SPS communication.

Aspect 73: The method of any of Aspects 1-72, wherein the first configuration communication comprises a first downlink control information transmission.

Aspect 74: The method of any of Aspects 1-72, wherein the first configuration communication comprises a first radio resource control (RRC) message.

Aspect 75: The method of Aspect 74, wherein the DMRS sharing indication comprises a DMRS lifespan parameter associated with the first DMRS.

Aspect 76: The method of Aspect 75, wherein receiving the second shared channel communication comprises receiving, based at least in part on the DMRS lifespan parameter having a specified DMRS lifespan parameter value, the second shared channel communication based at least in part on a second DMRS included in the second shared channel communication.

Aspect 77: The method of Aspect 76, further comprising receiving a first downlink control information (DCI) transmission associated with the first shared channel communication, the first DCI transmission comprising a first DMRS presence indicator that indicates that the first shared channel communication includes a first DMRS.

Aspect 78: The method of Aspect 77, further comprising receiving a second DCI transmission associated with the second shared channel communication, the second DCI transmission comprising a second DMRS presence indicator that indicates that the second shared channel communication does not include a second DMRS, wherein the second DCI transmission indicates a target DMRS, and wherein receiving the second shared channel communication comprises receiving the second shared channel communication based at least in part on the target DMRS.

Aspect 79: The method of Aspect 78, wherein the second DCI transmission indicates a target DMRS configuration associated with the second shared channel communication, and wherein the target DMRS comprises a most-recently received DMRS having a DMRS configuration that matches the target DMRS configuration.

Aspect 80: The method of either of Aspects 78 or 79, wherein the target DMRS is indicated by at least one of the RRC message or a wireless communication standard.

Aspect 81: The method of any of Aspects 77-80, wherein the DMRS sharing indication does not include a DMRS lifespan parameter associated with the first DMRS, and wherein receiving the second shared channel communication comprises receiving, based at least in part on the DMRS sharing indication not including the DMRS lifespan parameter, the second shared channel communication based at least in part on a second DMRS included in the second shared channel communication.

Aspect 82: A method of wireless communication performed by a base station, comprising: transmitting a first configuration communication associated with a first shared channel communication that includes a first demodulation reference signal (DMRS) having a first configurable DMRS lifespan, wherein the first configuration communication comprises a DMRS sharing indication associated with reuse of the first DMRS associated with a second shared channel communication; transmitting the first shared channel communication; and transmitting the second shared channel communication based at least in part on the DMRS sharing indication.

Aspect 83: The method of Aspect 82, wherein the second shared channel communication does not include a DMRS.

Aspect 84: The method of either of Aspects 82 or 83, wherein DMRS information associated with the first DMRS comprises at least one of: the first DMRS, a time domain transformation of the first DMRS, or a channel estimation output based at least in part on the first DMRS.

Aspect 85: The method of Aspect 84, wherein the second shared channel communication comprises a dynamically-scheduled shared channel communication or a semi-persistent scheduling shared channel communication.

Aspect 86: The method of any of Aspects 82-85, wherein the DMRS sharing indication comprises a first DMRS lifespan parameter value that indicates the first configurable DMRS lifespan.

Aspect 87: The method of Aspect 86, wherein transmitting the second shared channel communication comprises transmitting the second shared channel communication using the first DMRS based at least in part on transmitting the second shared channel communication within the first configurable DMRS lifespan.

Aspect 88: The method of any of Aspects 82-87, wherein transmitting the first configuration communication comprises transmitting a first DMRS configuration that includes the DMRS sharing indication, wherein the DMRS sharing indication comprises a first DMRS lifespan parameter value that indicates the first configurable DMRS lifespan, and wherein transmitting the first DMRS configuration comprises receiving a radio resource control (RRC) message that includes the first DMRS configuration.

Aspect 89: The method of Aspect 88, wherein the first DMRS configuration indicates a set of possible lifespan parameter values that includes the first DMRS lifespan parameter value, and wherein the DMRS sharing indication indicates a first possible lifespan parameter value of the set of possible lifespan parameter values, the first possible lifespan parameter value comprising the first DMRS lifespan parameter value.

Aspect 90: The method of either of Aspects 88 or 89, wherein the first DMRS lifespan parameter value is based at least in part on a channel coherence time.

Aspect 91: The method of any of Aspects 88-90, wherein the first DMRS lifespan parameter value is based at least in part on a capability of the UE to maintain phase continuity.

Aspect 92: The method of any of Aspects 88-91, wherein transmitting the first shared channel communication comprises transmitting the first shared channel communication in a reference slot, and wherein the first DMRS lifespan parameter value represents n−1 slots between the reference slot and a final slot of the first configurable DMRS lifespan, wherein n is the first DMRS lifespan parameter value.

Aspect 93: The method of any of Aspects 88-92, wherein transmitting the first shared channel communication comprises transmitting the first DMRS in a reference symbol of a reference slot, wherein the first DMRS comprises a last DMRS received in the reference slot, and wherein the first DMRS lifespan parameter value represents n−1 symbols between the reference symbol and a final symbol within the first configurable DMRS lifespan, wherein n is the first DMRS lifespan parameter value.

Aspect 94: The method of any of Aspects 88-93, wherein transmitting the second shared channel communication comprises transmitting the second shared channel communication without using the first DMRS based at least in part on an invalidation of the first DMRS.

Aspect 95: The method of Aspect 94, wherein the invalidation of the DMRS occurs prior to expiration of the first configurable DMRS lifespan.

Aspect 96: The method of either of Aspects 94 or 95, wherein the invalidation of the first DMRS is based at least in part on at least one of: a scheduled uplink transmission, a transmission configuration indicator change, or a downlink reception gap.

Aspect 97: The method of any of Aspects 88-96, wherein the first DMRS has a first DMRS configuration, the method further comprising transmitting, prior to an expiration of the first configurable DMRS lifespan, at least one additional shared channel communication that includes a second DMRS having a second DMRS configuration that matches the first DMRS configuration and having a second configurable DMRS lifespan.

Aspect 98: The method of any of Aspects 82-97, further comprising transmitting a storing configuration indication.

Aspect 99: The method of Aspect 98, wherein transmitting the storing configuration indication comprises transmitting at least one of a radio resource control message or a downlink control information transmission.

Aspect 100: The method of any of Aspects 82-99, further comprising transmitting an indication of a first DMRS identifier (ID) that corresponds to the first DMRS and a second DMRS that corresponds to a second DMRS.

Aspect 101: The method of Aspect 100, further comprising transmitting a new data indicator associated with the first DMRS ID.

Aspect 102: The method of either of Aspects 100 or 101, wherein the first DMRS ID is based at least in part on a slot in which the first DMRS is transmitted.

Aspect 103: The method of any of Aspects 82-102, further comprising receiving, from a user equipment (UE), a DMRS buffering capability indication that indicates a quantity of DMRSs that the UE is capable of buffering.

Aspect 104: The method of Aspect 103, wherein the quantity of DMRSs that the UE is capable of buffering comprises a quantity of DMRSs having one or more specified configuration attributes.

Aspect 105: The method of either of Aspects 103 or 104, wherein the quantity of DMRSs that the UE is capable of buffering comprises a quantity of full-band DMRSs with a specified rank.

Aspect 106: The method of any of Aspects 103-105, wherein the DMRS buffering capability indication indicates the quantity of DMRSs that the UE is capable of buffering based at least in part on indicating a memory capacity of the UE.

Aspect 107: The method of any of Aspects 82-106, further comprising: transmitting the first shared channel communication based at least in part on the first DMRS; and transmitting, based at least in part on the first DMRS, the second shared channel communication based at least in part on a slot offset corresponding to the first DMRS.

Aspect 108: The method of any of Aspects 82-107, wherein transmitting the first shared channel communication comprises transmitting the first shared channel communication based at least in part on the first DMRS, the method further comprising transmitting a second configuration communication comprising a DMRS reuse indication that indicates an association between the first DMRS and the second shared channel communication, wherein transmitting the second shared channel communication comprises transmitting the second shared channel communication based at least in part on the first DMRS.

Aspect 109: The method of Aspect 108, wherein the DMRS reuse indication indicates a first DMRS identifier associated with the first DMRS.

Aspect 110: The method of either of Aspects 108 or 109, wherein transmitting the first shared channel communication comprises transmitting the first shared channel communication in a target slot, and wherein the DMRS reuse indication comprises a slot offset value that indicates a slot offset from a reference slot to the target slot.

Aspect 111: The method of Aspect 110, wherein the slot offset value represents n−1 slots between the reference slot and the target slot, wherein n is the slot offset value.

Aspect 112: The method of Aspect 110, wherein the reference slot comprises a slot in which the second configuration communication is received or a slot in which the second shared channel communication is received.

Aspect 113: The method of Aspect 112, wherein the second shared channel communication is associated with a plurality of slots, and wherein the reference slot comprises a first slot of the plurality of slots or a last slot of the plurality of slots.

Aspect 114: The method of any of Aspects 110-113, wherein the DMRS reuse indication comprises a specified value, wherein the association between the first DMRS and the second shared channel communication is based at least in part on the specified value.

Aspect 115: The method of any of Aspects 82-114, wherein transmitting the first shared channel communication comprises transmitting the first shared channel communication based at least in part on the first DMRS, and wherein transmitting the second shared channel communication comprises transmitting, based at least in part on the first DMRS, the second shared channel communication based at least in part on the first DMRS having a specified characteristic.

Aspect 116: The method of Aspect 115, wherein the first DMRS has the specified characteristic based at least in part on the first DMRS being a most recently received DMRS.

Aspect 117: The method of any of Aspects 82-116, wherein transmitting the first shared channel communication comprises transmitting the first shared channel communication based at least in part on the first DMRS, the method further comprising: transmitting a second configuration communication comprising a DMRS reuse indication that indicates an association between a prior DMRS and a third shared channel communication, wherein the prior DMRS is not buffered by a user equipment (UE); and receiving a non-acknowledgement feedback message based at least in part on a failure of the UE to receive the third shared channel communication.

Aspect 118: The method of any of Aspects 82-117, wherein transmitting the first shared channel communication comprises transmitting the first shared channel communication in a reference slot, the first DMRS having a first DMRS configuration, the method further comprising: transmitting a third shared channel communication in the reference slot, wherein the third shared channel communication includes a second DMRS having a second DMRS configuration; transmitting a second configuration communication that schedules the second shared channel communication, wherein the second configuration communication indicates a target DMRS configuration corresponding to the second shared channel communication; and transmitting, using a target DMRS, the second shared channel communication based at least in part on the target DMRS configuration matching the first DMRS configuration or the second DMRS configuration, wherein the target DMRS comprises the first DMRS or the second DMRS.

Aspect 119: The method of any of Aspects 82-118, wherein transmitting the first shared channel communication comprises transmitting the first shared channel communication in a reference slot, the first DMRS having a first DMRS configuration, the method further comprising: transmitting a third shared channel communication in the reference slot, wherein the third shared channel communication includes a second DMRS having the first DMRS configuration; and transmitting a second configuration communication that schedules the second shared channel communication, wherein the second configuration communication indicates a target DMRS configuration corresponding to the second shared channel communication, wherein transmitting the second shared channel communication comprises transmitting, using a target DMRS, the second shared channel communication based at least in part on a DMRS configuration of the target DMRS matching the target DMRS configuration, wherein the target DMRS comprises a DMRS of a set of buffered DMRSs that includes the first DMRS and the second DMRS.

Aspect 120: The method of Aspect 119, further comprising receiving a target DMRS feedback based at least in part on the target DMRS being buffered.

Aspect 121: The method of any of Aspects 82-120, wherein the first configuration communication comprises a first downlink control information (DCI) transmission, wherein the DMRS sharing indication comprises a DMRS sharing parameter, and wherein transmitting the first shared channel communication comprises transmitting the first shared channel communication based at least in part on the DMRS sharing parameter.

Aspect 122: The method of Aspect 121, wherein the DMRS sharing parameter comprises at least one DMRS buffering parameter, the at least one DMRS buffering parameter indicating at least one of: a first DMRS presence parameter value, a first DMRS lifespan parameter value, a first DMRS identifier (ID) parameter value, a first DMRS new data indicator parameter value, or a first DMRS reuse parameter value.

Aspect 123: The method of Aspect 122, wherein the DMRS sharing parameter includes a first portion and a second portion, wherein the first portion includes the first DMRS presence parameter value, and wherein the second portion includes: only the first DMRS lifespan parameter value, the first DMRS ID parameter value, and the first DMRS new data indicator parameter value based at least in part on the first DMRS presence parameter value being a first specified value of a plurality of specified values, wherein the first specified value indicates that the first shared channel communication includes the first DMRS.

Aspect 124: The method of Aspect 123, wherein the first DMRS presence parameter value is the first specified value, the method further comprising transmitting a second DCI transmission that schedules the second shared channel communication and that includes an additional DMRS sharing parameter, wherein the additional DMRS sharing parameter comprises a second DMRS presence parameter value and a second DMRS reuse parameter value.

Aspect 125: The method of Aspect 124, wherein transmitting the second shared channel comprises transmitting the second shared channel based at least in part on the first DMRS based at least in part on the second DMRS presence parameter value being a second specified value of the plurality of specified values, wherein the second specified value indicates that the second shared communication does not include a second DMRS.

Aspect 126: The method of Aspect 125, wherein transmitting the second shared channel comprises transmitting the second shared channel based at least in part on the first DMRS based at least in part on the second DMRS reuse parameter value indicating the first DMRS.

Aspect 127: The method of any of Aspects 122-126, further comprising transmitting a second DCI transmission that schedules the second shared channel communication, the second DCI transmission comprising only a second DMRS reuse parameter value based at least in part on a second DMRS presence parameter value being a first specified value of a plurality of specified values, wherein the first specified value indicates that the second shared channel communication does not include a DMRS.

Aspect 128: The method of any of Aspects 122-127, wherein transmitting the second shared channel communication comprises transmitting the second shared channel communication based at least in part on a second DMRS included in the second shared channel communication based at least in part on the first DMRS lifespan parameter having a value of zero.

Aspect 129: The method of any of Aspects 122-128, further comprising transmitting a radio resource control (RRC) message comprising the first DMRS lifespan parameter value, wherein the at least one DMRS buffering parameter does not include a DMRS lifespan parameter based at least in part on transmitting the RRC message comprising the first DMRS lifespan parameter value.

Aspect 130: The method of any of Aspects 122-129, further comprising: transmitting a second DCI transmission that schedules a third shared channel communication, wherein the second DCI transmission includes a DMRS sharing parameter that indicates that the third shared channel communication does not include a DMRS; and receiving a non-acknowledgement feedback corresponding to the third shared channel based at least in part on a failure of the UE to receive the third shared channel communication.

Aspect 131: The method of Aspect 130, wherein the third shared channel communication comprises a semi-persistent scheduling (SPS) communication, and wherein the second DCI transmission schedules the third shared channel communication based at least in part on indicating an activation of the SPS communication.

Aspect 132: The method of any of Aspects 82-131, wherein the first configuration communication comprises a first downlink control information transmission.

Aspect 133: The method of any of Aspects 82-131, wherein the first configuration communication comprises a first radio resource control (RRC) message.

Aspect 134: The method of Aspect 133, wherein the DMRS sharing indication comprises a DMRS lifespan parameter associated with the first DMRS.

Aspect 135: The method of Aspect 134, wherein transmitting the second shared channel communication comprises transmitting, based at least in part on the DMRS lifespan parameter having a specified DMRS lifespan parameter value, the second shared channel communication based at least in part on a second DMRS included in the second shared channel communication.

Aspect 136: The method of Aspect 135, further comprising transmitting a first downlink control information (DCI) transmission associated with the first shared channel communication, the first DCI transmission comprising a first DMRS presence indicator that indicates that the first shared channel communication includes a first DMRS.

Aspect 137: The method of Aspect 136, further comprising transmitting a second DCI transmission associated with the second shared channel communication, the second DCI transmission comprising a second DMRS presence indicator that indicates that the second shared channel communication does not include a second DMRS, wherein the second DCI transmission indicates a target DMRS, and wherein transmitting the second shared channel communication comprises transmitting the second shared channel communication based at least in part on the target DMRS.

Aspect 138: The method of Aspect 137, wherein the second DCI transmission indicates a target DMRS configuration associated with the second shared channel communication, and wherein the target DMRS comprises a most-recently received DMRS having a DMRS configuration that matches the target DMRS configuration.

Aspect 139: The method of either of Aspects 137 or 138, wherein the target DMRS is indicated by at least one of the RRC message or a wireless communication standard.

Aspect 140: The method of any of Aspects 136-139, wherein the DMRS sharing indication does not include a DMRS lifespan parameter associated with the first DMRS, and wherein transmitting the second shared channel communication comprises transmitting, based at least in part on the DMRS sharing indication not including the DMRS lifespan parameter, the second shared channel communication based at least in part on a second DMRS included in the second shared channel communication.

Aspect 141: An apparatus for wireless communication at a device, comprising a processor; memory coupled with the processor; and instructions stored in the memory and executable by the processor to cause the apparatus to perform the method of one or more of Aspects 1-81.

Aspect 142: A device for wireless communication, comprising a memory and one or more processors coupled to the memory, the one or more processors configured to perform the method of one or more of Aspects 1-81.

Aspect 143: An apparatus for wireless communication, comprising at least one means for performing the method of one or more of Aspects 1-81.

Aspect 144: A non-transitory computer-readable medium storing code for wireless communication, the code comprising instructions executable by a processor to perform the method of one or more of Aspects 1-81.

Aspect 145: A non-transitory computer-readable medium storing a set of instructions for wireless communication, the set of instructions comprising one or more instructions that, when executed by one or more processors of a device, cause the device to perform the method of one or more of Aspects 1-81.

Aspect 146: An apparatus for wireless communication at a device, comprising a processor; memory coupled with the processor; and instructions stored in the memory and executable by the processor to cause the apparatus to perform the method of one or more of Aspects 82-140.

Aspect 147: A device for wireless communication, comprising a memory and one or more processors coupled to the memory, the one or more processors configured to perform the method of one or more of Aspects 82-140.

Aspect 148: An apparatus for wireless communication, comprising at least one means for performing the method of one or more of Aspects 82-140.

Aspect 149: A non-transitory computer-readable medium storing code for wireless communication, the code comprising instructions executable by a processor to perform the method of one or more of Aspects 82-140.

Aspect 150: A non-transitory computer-readable medium storing a set of instructions for wireless communication, the set of instructions comprising one or more instructions that, when executed by one or more processors of a device, cause the device to perform the method of one or more of Aspects 82-140.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive a first configuration communication associated with a first shared channel communication that includes a first demodulation reference signal (DMRS) having a first configurable DMRS lifespan, wherein the first configuration communication comprises a DMRS sharing indication associated with reuse of the first DMRS associated with a second shared channel communication;
receive a control channel communication comprising a DMRS reuse indication that indicates:
an association between the first DMRS and the second shared channel communication, and
a slot offset value that indicates a slot offset from a reference slot to a target slot;
receive, in the target slot, the first shared channel communication based at least in part on the first DMRS; and
receive the second shared channel communication based at least in part on the DMRS sharing indication and the first DMRS.

2. The UE of claim 1, wherein the DMRS sharing indication comprises a first DMRS lifespan parameter value that indicates the first configurable DMRS lifespan, and wherein the one or more processors, to receive the second shared channel communication, are configured to receive the second shared channel communication using the first DMRS based at least in part on reception of the second shared channel communication within the first configurable DMRS lifespan.

3. The UE of claim 1, wherein the one or more processors, to receive the first configuration communication, are configured to receive a first DMRS configuration that includes the DMRS sharing indication, wherein the DMRS sharing indication comprises a first DMRS lifespan parameter value that indicates the first configurable DMRS lifespan, and wherein the one or more processors, to receive the first DMRS configuration, are configured to receive a radio resource control (RRC) message that includes the first DMRS configuration.

4. The UE of claim 3, wherein the first DMRS configuration indicates a set of possible lifespan parameter values that includes the first DMRS lifespan parameter value, and wherein the DMRS sharing indication indicates a first possible lifespan parameter value of the set of possible lifespan parameter values, the first possible lifespan parameter value comprising the first DMRS lifespan parameter value.

5. The UE of claim 1, wherein the one or more processors are further configured to buffer a plurality of DMRSs, wherein the one or more processors, to buffer the plurality of DMRSs, are configured to:
store first DMRS information corresponding to the first DMRS, wherein the first DMRS information is associated with a first DMRS identifier (ID) that corresponds to the first DMRS; and
store second DMRS information corresponding to a second DMRS, wherein the second DMRS information is associated with a second DMRS ID that corresponds to the second DMRS.

6. The UE of claim 5, wherein the first DMRS information is associated with a first value of a communication parameter and wherein the second DMRS information is associated with a second value of the communication parameter.

7. The UE of claim 5, wherein the one or more processors, to store the second DMRS information, are configured to store, based at least in part on the first DMRS ID being associated with the second shared channel communication, a weighted average of a first channel estimation output corresponding to the first DMRS and a second channel estimation corresponding to the second DMRS.

8. The UE of claim 5, wherein the one or more processors, to store the second DMRS information, are configured to associate the first DMRS ID with the second DMRS information.

9. The UE of claim 5, wherein the first DMRS ID is based at least in part on a slot in which the first DMRS is transmitted.

10. The UE of claim 1, wherein the DMRS reuse indication indicates a first DMRS identifier associated with the first DMRS.

11. The UE of claim 1, wherein the first configuration communication comprises a first downlink control information (DCI) transmission, wherein the DMRS sharing indication comprises a DMRS sharing parameter, wherein the one or more processors, to receive the first shared channel communication, are configured to receive the first shared channel communication based at least in part on the DMRS sharing parameter, and wherein the DMRS sharing parameter comprises at least one DMRS buffering parameter, the at least one DMRS buffering parameter comprising at least one of:
a first DMRS presence parameter value,
a first DMRS lifespan parameter value,
a first DMRS identifier (ID) parameter value,
a first DMRS new data indicator parameter value, or
a first DMRS reuse parameter value.

12. The UE of claim 11, wherein the DMRS sharing parameter includes a first portion and a second portion, wherein the first portion includes the first DMRS presence parameter value, and wherein the second portion includes:
only the first DMRS lifespan parameter value, the first DMRS ID parameter value, and the first DMRS new data indicator parameter value based at least in part on the first DMRS presence parameter value being a first specified value of a plurality of specified values, wherein the first specified value indicates that the first shared channel communication includes the first DMRS.

13. The UE of claim 12, wherein the one or more processors are further configured to:
receive a second DCI transmission that schedules a third shared channel communication, wherein the second DCI transmission includes a DMRS sharing parameter that indicates that the third shared channel communication does not include a DMRS; and
refrain from receiving the third shared channel communication based at least in part on the DMRS sharing parameter and an expiration of a most recent buffered DMRS information.

14. The UE of claim 13, wherein the third shared channel communication comprises a semi-persistent scheduling (SPS) communication, and wherein the second DCI transmission schedules the third shared channel communication based at least in part on indicating an activation of the SPS communication.

15. The UE of claim 1, wherein the first configuration communication comprises a first radio resource control (RRC) message, and wherein the DMRS sharing indication comprises a DMRS lifespan parameter associated with the first DMRS, wherein the one or more processors are further configured to receive a first downlink control information (DCI) transmission associated with the first shared channel communication, the first DCI transmission comprising a first DMRS presence indicator that indicates whether the first shared channel communication includes a first DMRS.

16. The UE of claim 15, wherein the one or more processors are further configured to receive a second DCI transmission associated with the second shared channel communication, the second DCI transmission comprising a second DMRS presence indicator that indicates that the second shared channel communication does not include a second DMRS, wherein the second DCI transmission indicates a target DMRS, and wherein the one or more processors, to receive the second shared channel communication, are configured to receive the second shared channel communication based at least in part on the target DMRS.

17. The UE of claim 16, wherein the second DCI transmission indicates a target DMRS configuration associated with the second shared channel communication, and wherein the target DMRS comprises a most-recently received DMRS having a DMRS configuration that matches the target DMRS configuration.

18. A base station for wireless communication, comprising:
one or more memories; and
one or more processors, coupled to the one or more memories, configured to:
transmit a first configuration communication associated with a first shared channel communication that includes a first demodulation reference signal (DMRS) having a first configurable DMRS lifespan, wherein the first configuration communication comprises a DMRS sharing indication associated with reuse of the first DMRS associated with a second shared channel communication;
transmit a control channel communication comprising a DMRS reuse indication that indicates:
an association between the first DMRS and the second shared channel communication, and
a slot offset value that indicates a slot offset from a reference slot to a target slot;
transmit, in the target slot, the first shared channel communication based at least in part on the first DMRS; and
transmit the second shared channel communication based at least in part on the DMRS sharing indication and the first DMRS.

19. The base station of claim 18, wherein the DMRS sharing indication comprises a first DMRS lifespan parameter value that indicates the first configurable DMRS lifespan.

20. The base station of claim 18, wherein the one or more processors, to transmit the first configuration communication, are configured to transmit, to a user equipment (UE), a first DMRS configuration that includes the DMRS sharing indication, wherein the DMRS sharing indication comprises a first DMRS lifespan parameter value that indicates the first configurable DMRS lifespan, and wherein the one or more processors, to transmit the first DMRS configuration, are configured to transmit a radio resource control (RRC) message that includes the first DMRS configuration.

21. The base station of claim 18, wherein the DMRS reuse indication indicates a first DMRS identifier associated with the first DMRS.

22. The base station of claim 18, wherein the first configuration communication comprises a first radio resource control (RRC) message, and wherein the DMRS sharing indication comprises a DMRS lifespan parameter associated with the first DMRS, wherein the one or more processors are further configured to transmit a first downlink control information (DCI) transmission associated with the first shared channel communication, the first DCI transmission comprising a first DMRS presence indicator that indicates whether the first shared channel communication includes a first DMRS.

23. A method of wireless communication performed by a user equipment (UE), comprising:
receiving a first configuration communication associated with a first shared channel communication that includes a first demodulation reference signal (DMRS) having a first configurable DMRS lifespan, wherein the first configuration communication comprises a DMRS sharing indication associated with reuse of the first DMRS associated with a second shared channel communication;
receiving a control channel communication comprising a DMRS reuse indication that indicates:
an association between the first DMRS and the second shared channel communication, and
a slot offset value that indicates a slot offset from a reference slot to a target slot;
receiving, in the target slot, the first shared channel communication based at least in part on the first DMRS; and
receiving the second shared channel communication based at least in part on the DMRS sharing indication and the first DMRS.

24. The method of claim 23, further comprising buffering a plurality of DMRSs, wherein buffering the plurality of DMRSs comprises:
storing first DMRS information corresponding to the first DMRS, wherein the first DMRS information is associated with a first DMRS identifier (ID) that corresponds to the first DMRS; and
storing second DMRS information corresponding to a second DMRS, wherein the second DMRS information is associated with a second DMRS ID that corresponds to the second DMRS.

25. A method of wireless communication performed by a base station, comprising:
transmitting a first configuration communication associated with a first shared channel communication that includes a first demodulation reference signal (DMRS) having a first configurable DMRS lifespan, wherein the first configuration communication comprises a DMRS sharing indication associated with reuse of the first DMRS associated with a second shared channel communication;
transmitting a control channel communication comprising a DMRS reuse indication that indicates:
an association between the first DMRS and the second shared channel communication, and
a slot offset value that indicates a slot offset from a reference slot to a target slot;

transmitting, in the target slot, the first shared channel communication based at least in part on the first DMRS; and transmitting the second shared channel communication based at least in part on the DMRS sharing indication and the first DMRS.

26. The method of claim 25, wherein the DMRS sharing indication comprises a first DMRS lifespan parameter value that indicates the first configurable DMRS lifespan.

27. The method of claim 23, wherein the DMRS sharing indication comprises a first DMRS lifespan parameter value that indicates the first configurable DMRS lifespan, and wherein receiving the second shared channel communication comprises receiving the second shared channel communication using the first DMRS based at least in part on reception of the second shared channel communication within the first configurable DMRS lifespan.

28. The method of claim 23, wherein receiving the first configuration communication comprises receiving a first DMRS configuration that includes the DMRS sharing indication, wherein the DMRS sharing indication comprises a first DMRS lifespan parameter value that indicates the first configurable DMRS lifespan.

29. The method of claim 23, wherein the DMRS reuse indication indicates a first DMRS identifier associated with the first DMRS.

30. The method of claim 23, wherein the first configuration communication comprises a first downlink control information (DCI) transmission, wherein the DMRS sharing indication comprises a DMRS sharing parameter, wherein receiving the first shared channel communication comprises receiving the first shared channel communication based at least in part on the DMRS sharing parameter.

\* \* \* \* \*